US011613026B2

(12) United States Patent
Higo

(10) Patent No.: US 11,613,026 B2
(45) Date of Patent: Mar. 28, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomoaki Higo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 16/431,168

(22) Filed: Jun. 4, 2019

(65) Prior Publication Data

US 2019/0389082 A1    Dec. 26, 2019

(30) Foreign Application Priority Data

Jun. 21, 2018  (JP) .............................. JP2018-118122

(51) Int. Cl.
| | |
|---|---|
| *B25J 9/16* | (2006.01) |
| *B25J 15/06* | (2006.01) |
| *B25J 19/02* | (2006.01) |
| *G06N 3/08* | (2023.01) |
| *G06N 20/00* | (2019.01) |

(52) U.S. Cl.
CPC ......... *B25J 15/0616* (2013.01); *B25J 9/1697* (2013.01); *B25J 19/023* (2013.01); *G06N 3/08* (2013.01); *G06N 20/00* (2019.01)

(58) Field of Classification Search
USPC .............................................. 700/245–264
See application file for complete search history.

(56) References Cited

U.S. PATENT DOCUMENTS

| | | | | |
|---|---|---|---|---|
| 7,637,492 | B2* | 12/2009 | Brugge | B65H 3/0816 |
| | | | | 271/108 |
| 8,386,079 | B1* | 2/2013 | Kohler | G06N 3/008 |
| | | | | 700/250 |
| 9,333,649 | B1* | 5/2016 | Bradski | G06T 19/003 |
| 10,722,314 | B2* | 7/2020 | Danitz | B25J 9/104 |
| 10,751,759 | B2* | 8/2020 | Sezaki | B25J 9/06 |
| 10,875,192 | B2* | 12/2020 | Tanaka | B25J 9/1669 |
| 11,091,355 | B1* | 8/2021 | Lilliston, III | B25B 11/005 |
| 11,260,534 | B2* | 3/2022 | Higo | G06T 7/0004 |
| 2009/0238670 | A1* | 9/2009 | Helgi | B25J 11/0045 |
| | | | | 414/816 |
| 2013/0192953 | A1* | 8/2013 | Remijnse | B65G 43/08 |
| | | | | 198/341.01 |
| 2016/0207195 | A1* | 7/2016 | Eto | B25J 15/0616 |

(Continued)

FOREIGN PATENT DOCUMENTS

| | | |
|---|---|---|
| CN | 1669378 A | 9/2005 |
| CN | 103412496 A | 11/2013 |

(Continued)

*Primary Examiner* — Jonathan L Sample
(74) *Attorney, Agent, or Firm* — Canon U.S.A., Inc. I.P. Division

(57) ABSTRACT

An information processing apparatus to output control information for controlling a suction device configured to suction a packaged object includes an input unit and an output unit. The input unit inputs an image obtained by performing image capturing of a surface of the packaged object. The output unit outputs the control information to control timing at which suction is started by the suction device, based on a state of the surface of the packaged object specified from the image.

20 Claims, 22 Drawing Sheets

(56) References Cited

U.S. PATENT DOCUMENTS

2018/0322623 A1* 11/2018 Memo ................... G06T 7/0004
2021/0402592 A1* 12/2021 Takagi .................... B25J 9/104

FOREIGN PATENT DOCUMENTS

| | | |
|---|---|---|
| CN | 205441070 U | 8/2016 |
| CN | 107895301 A | 4/2018 |
| DE | 202007015153 U1 | 3/2009 |
| DE | 102007054867 A1 | 5/2009 |
| DE | 102012003160 A1 | 9/2012 |
| JP | H03231144 A | 10/1991 |
| JP | H10-193291 A | 7/1998 |
| JP | 2001175856 A | 6/2001 |
| JP | 2014213395 A | 11/2014 |
| NO | 2018056417 A1 | 3/2018 |

* cited by examiner

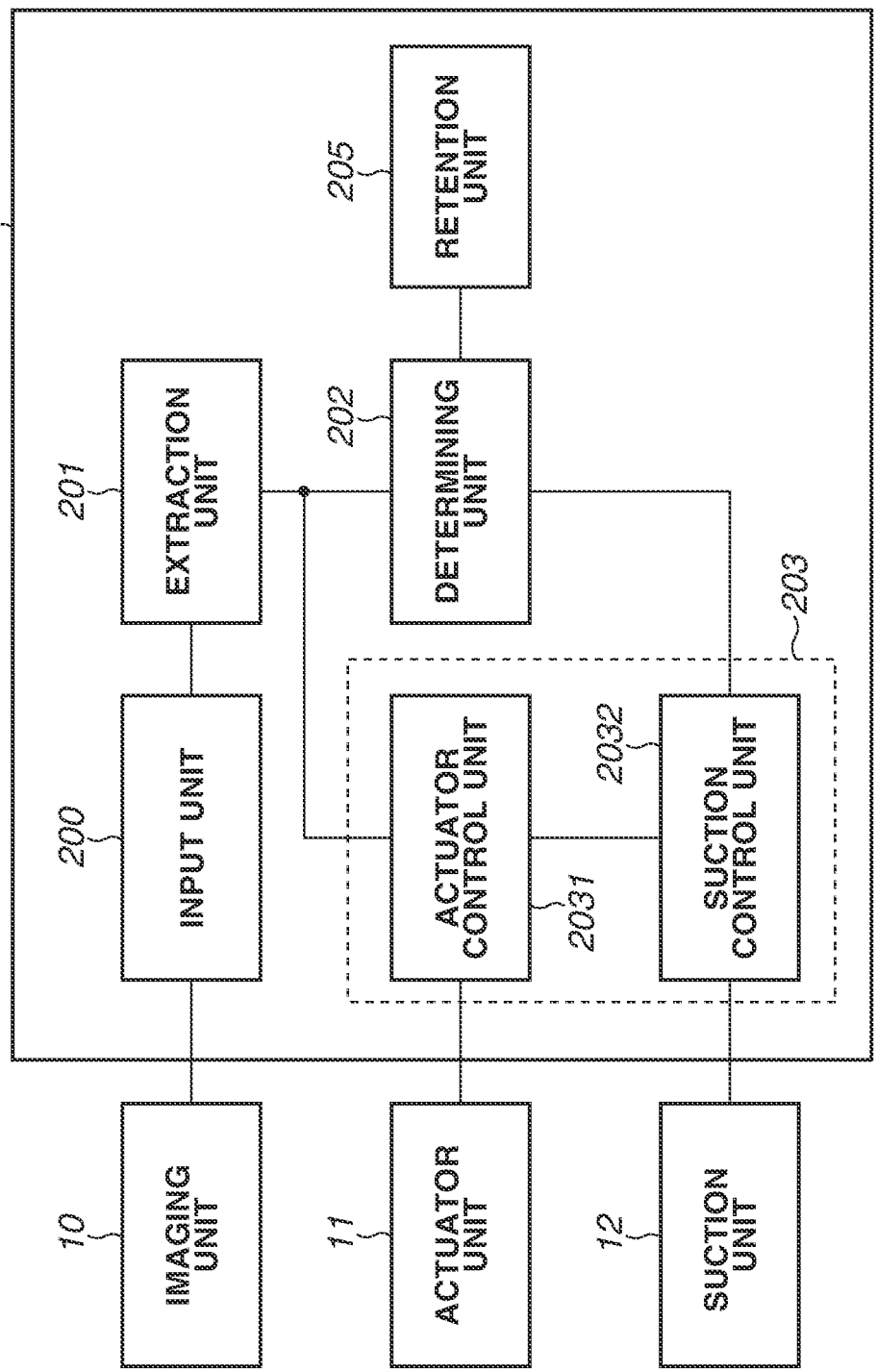

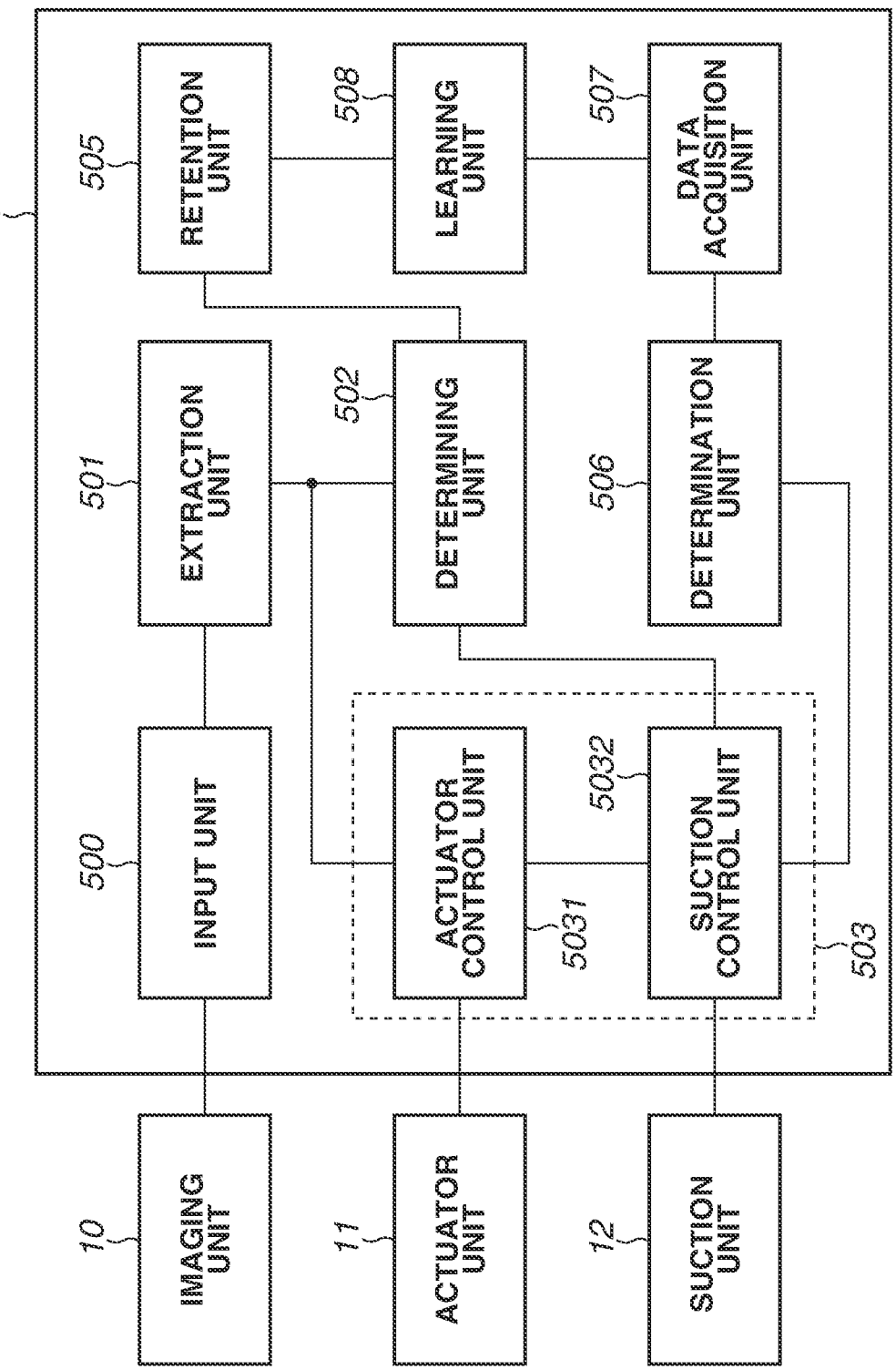

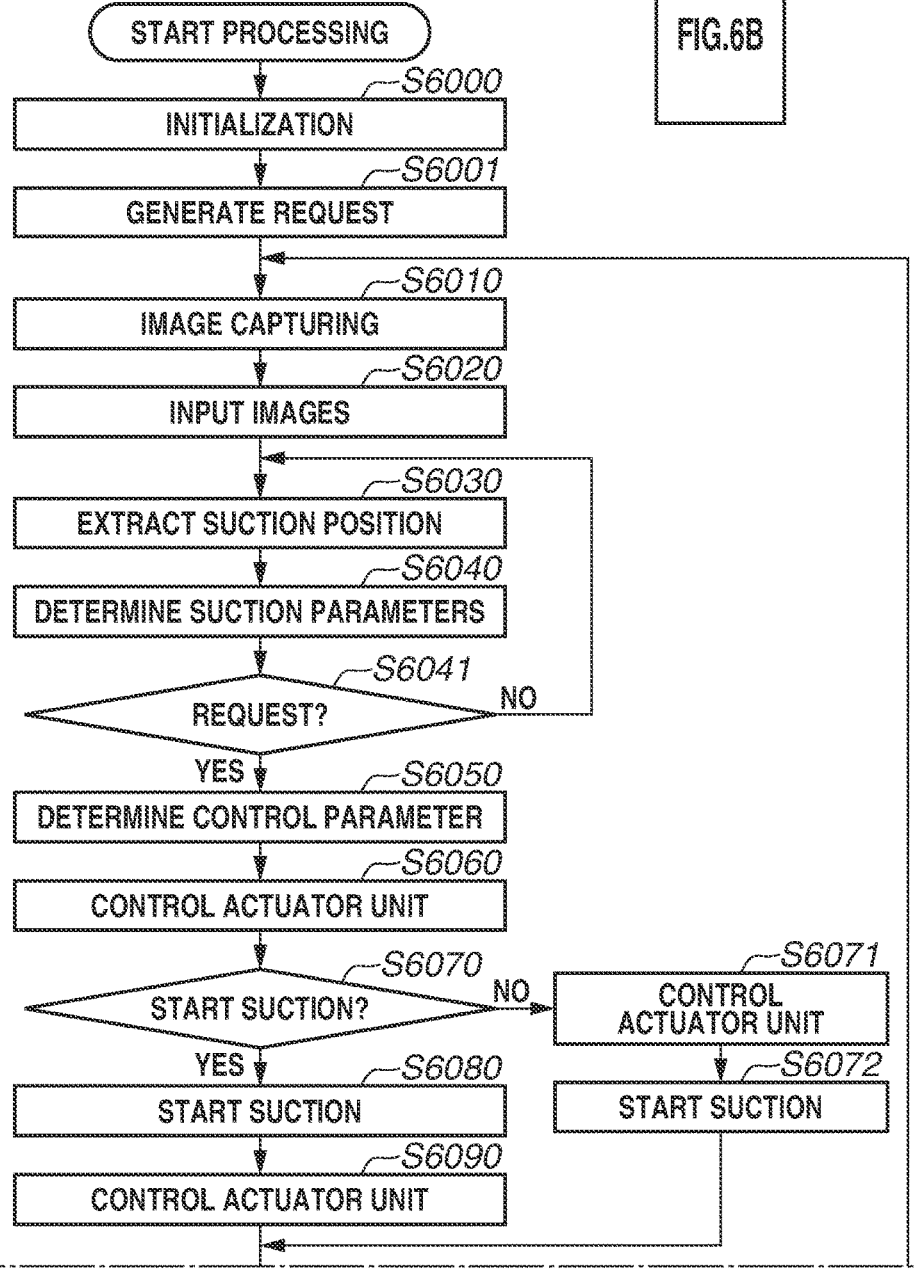

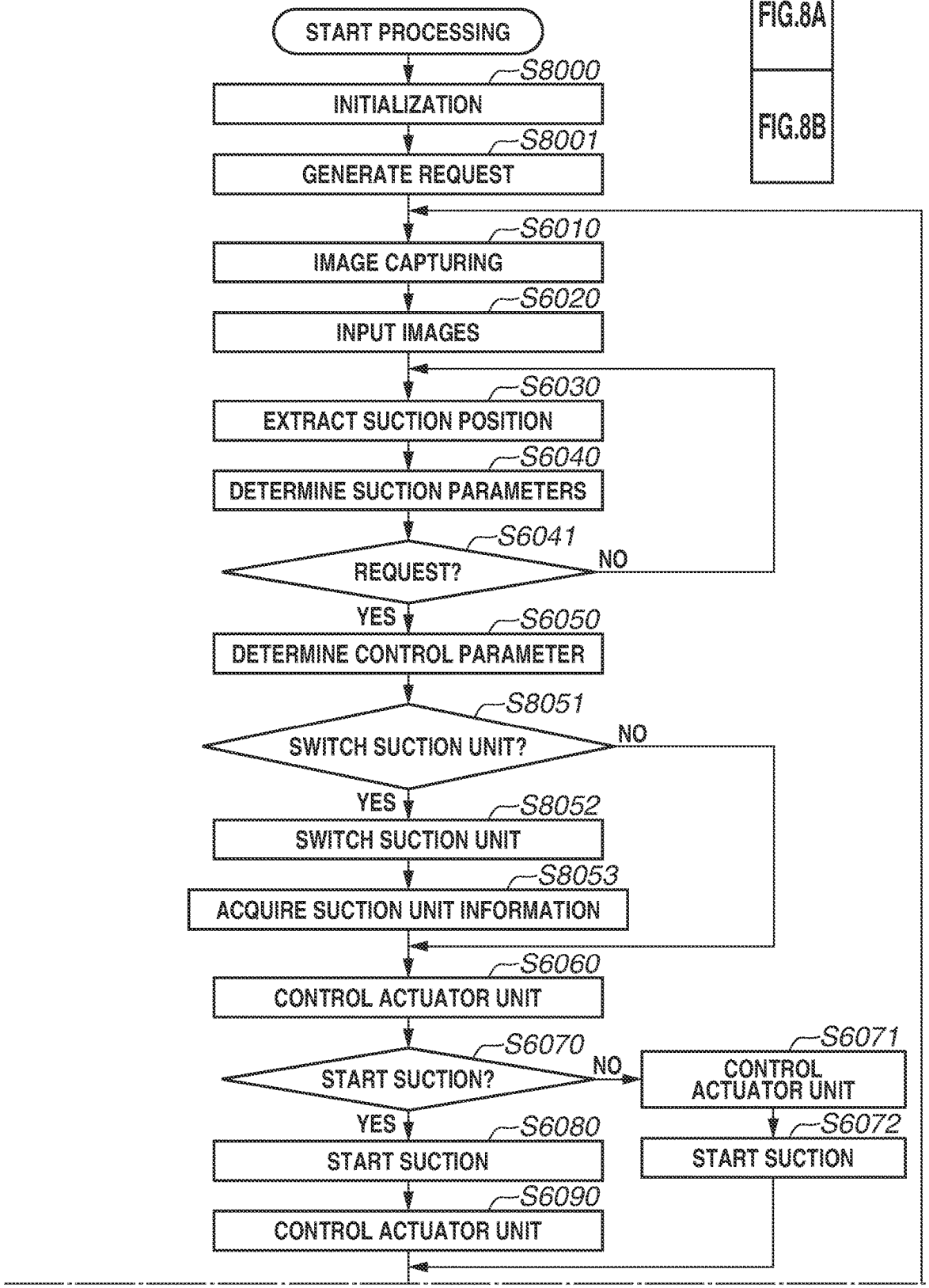

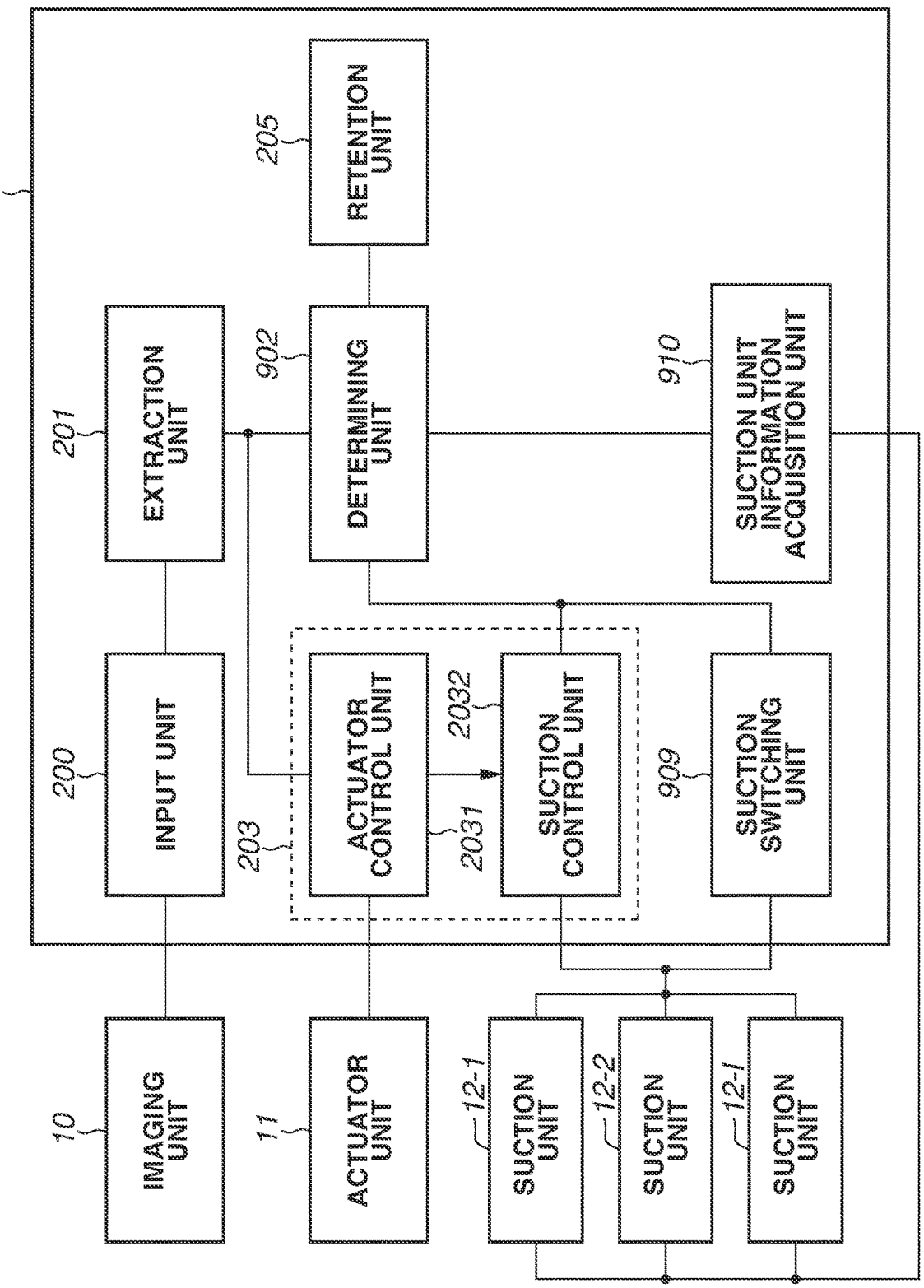

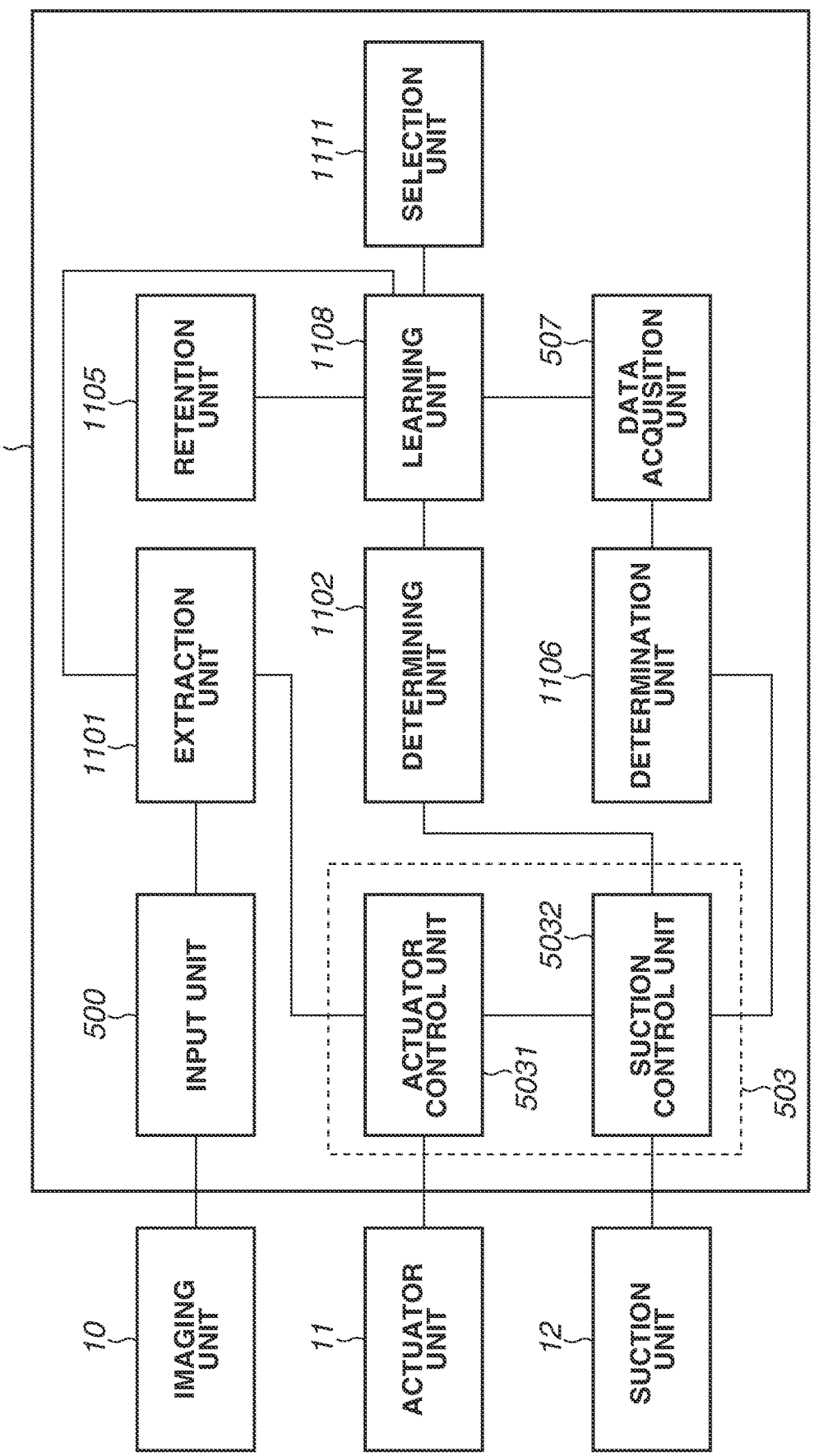

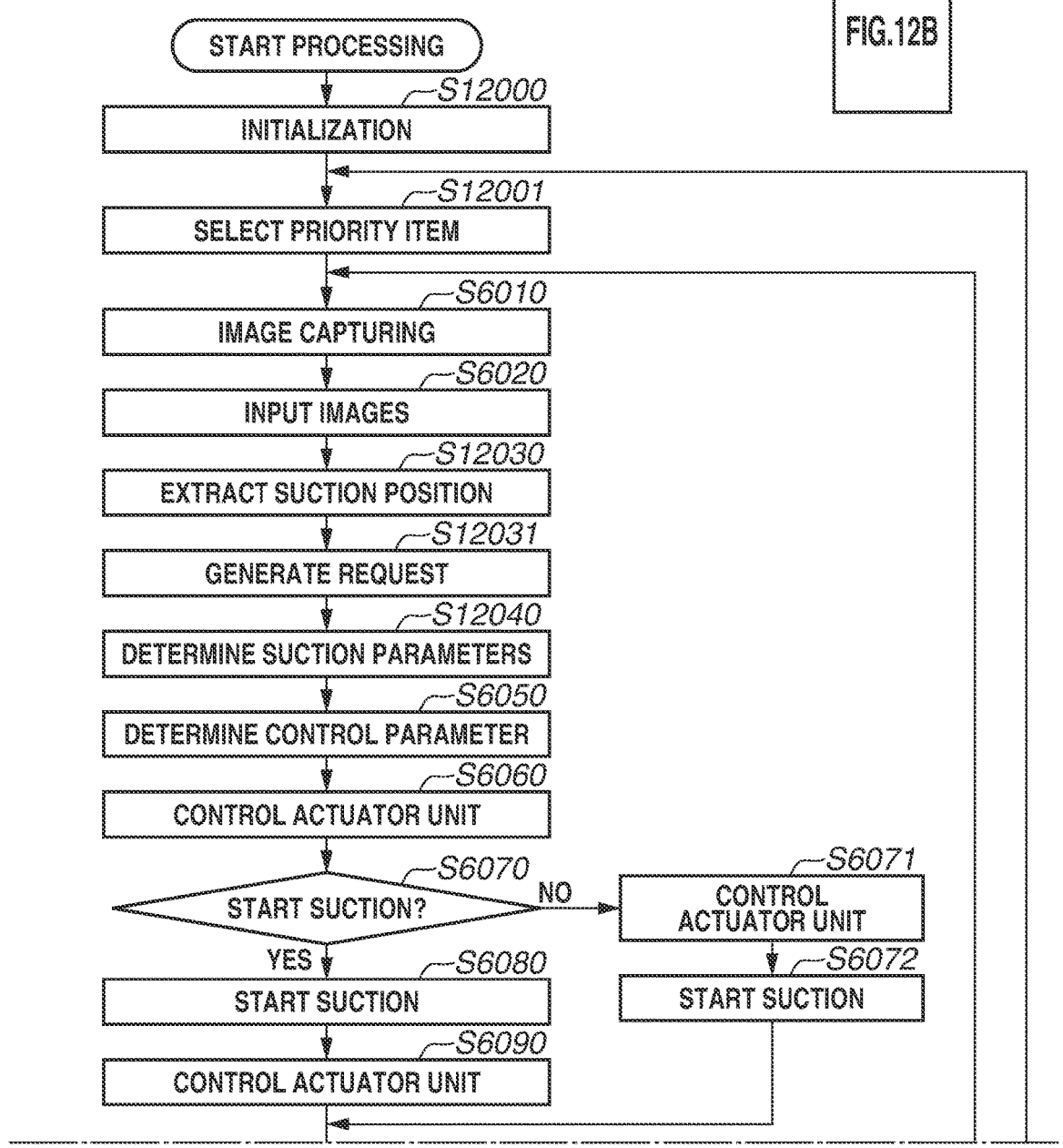

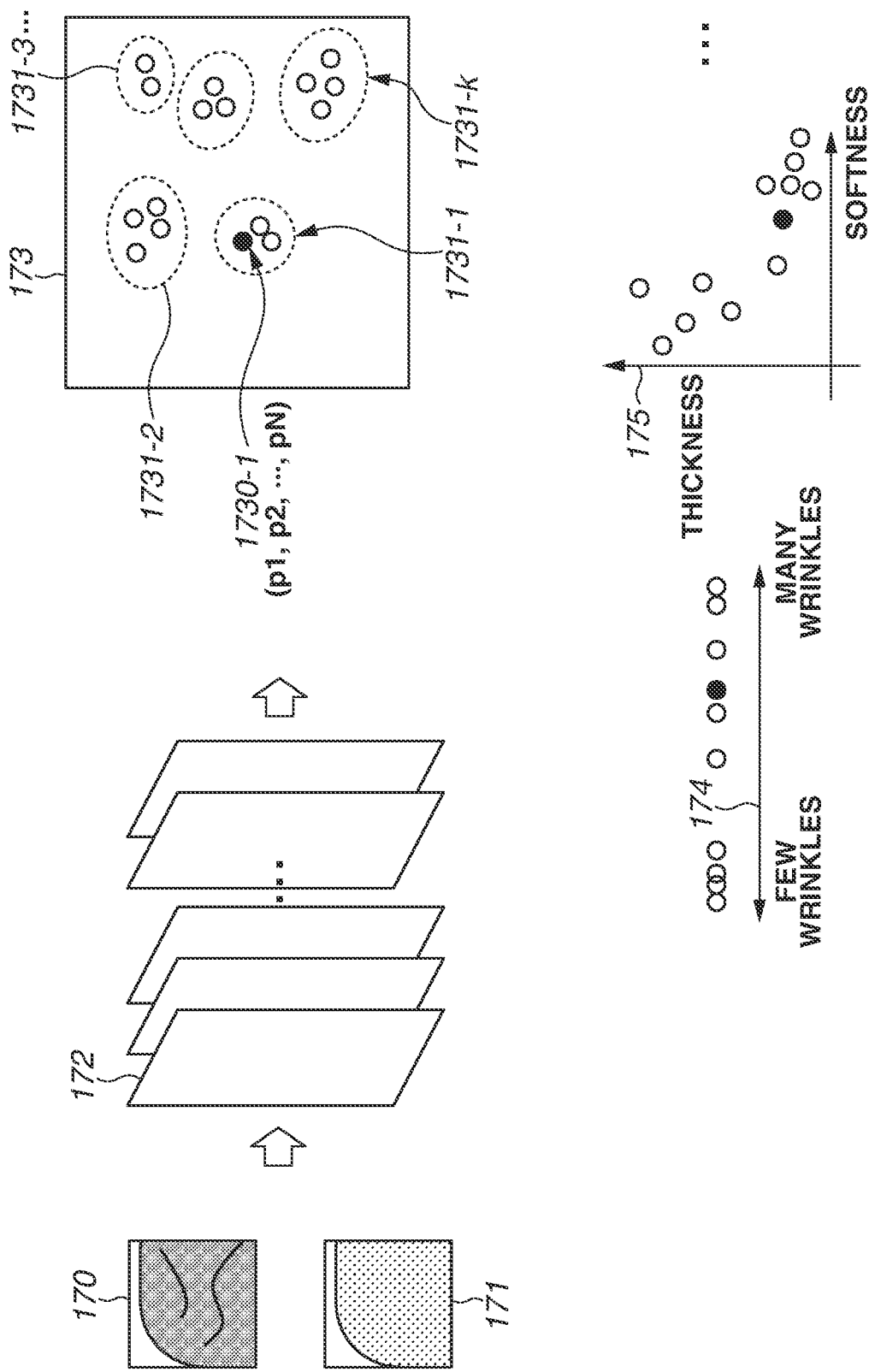

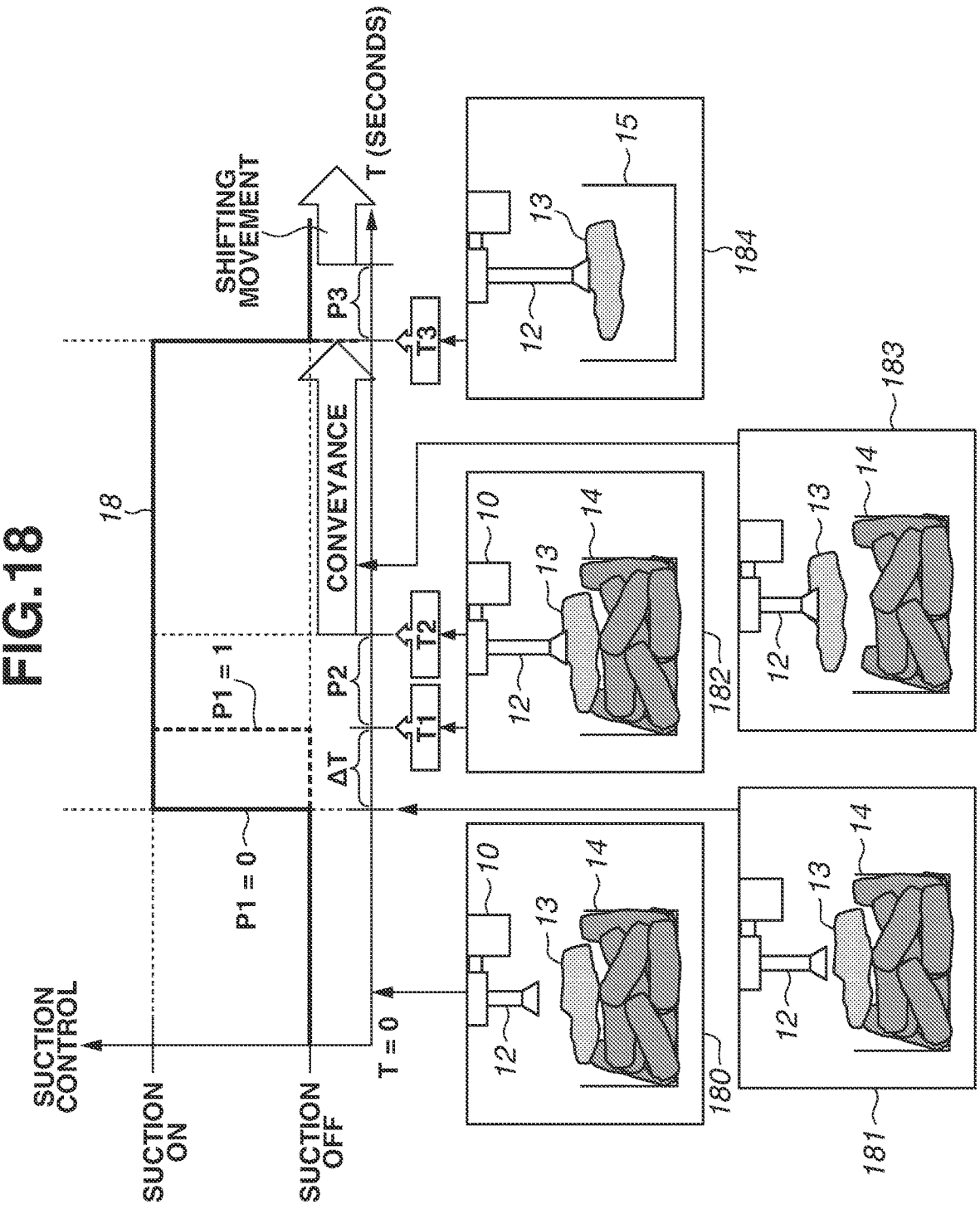

FIG.19A

| FEATURE VECTOR GROUP | TIMING FOR STARTING SUCTION (P1) | | FIRST REST TIME (P2) | | SECOND REST TIME (P3) | |
|---|---|---|---|---|---|---|
| 1731-1 | BEFORE CONTACT | ○ | 0.1 | ○ | 0 | ○ |
| 1731-2 | AFTER CONTACT | ○ | 0.1 | × | 0.1 | ○ |
| 1731-3 | AFTER CONTACT | × | 0.2 | × | 0.2 | ○ |
| ... | | | | | | |
| 1731-k | BEFORE CONTACT | × | 0 | × | 0.1 | × |

FIG.19B

| FEATURE VECTOR GROUP | SUCTION UNIT INFORMATION | TIMING FOR STARTING SUCTION (P1) | | FIRST REST TIME (P2) | | SECOND REST TIME (P3) | |
|---|---|---|---|---|---|---|---|
| 1731-1 | 12-1 | BEFORE CONTACT | × | 0.1 | × | 0 | ○ |
| 1731-1 | 12-2 | BEFORE CONTACT | ○ | 0.1 | × | 0 | × |
| 1731-1 | 12-3 | BEFORE CONTACT | × | 0.1 | × | 0 | × |
| 1731-1 | 12-k | BEFORE CONTACT | × | 0.1 | × | 0 | × |
| 1731-2 | 12-1 | AFTER CONTACT | ○ | 0.1 | ○ | 0.1 | ○ |
| 1731-3 | 12-2 | AFTER CONTACT | ○ | 0.2 | ○ | 0.2 | ○ |
| ... | | | | | | | |
| 1731-k | 12-k | BEFORE CONTACT | ○ | 0 | ○ | 0.1 | × | ns
INFORMATION PROCESSING APPARATUS, INFORMATION PROCESSING METHOD, AND STORAGE MEDIUM

BACKGROUND

Field

Aspects of the present disclosure generally relate to a technique to attract an object by suction with use of a robot.

Description of the Related Art

Some industrial robots in which a suction unit such as a suction pad is attached to the fore-end of a robot arm are frequently used to attract an object by suction to convey the object. To attract the object by suction, it is necessary to apply the suction pad to an area, on the surface of the object, which is easy to attract by suction, and to perform suction. In a case where the object is a bagged object, in which the object is bagged with a packing material, it is necessary to attract, by suction, the object that is in the state of being put in the bag.

Japanese Patent Application Laid-Open No. 2014-213395 discusses a technique to attract, by suction, a bagged object by a suction unit performing suction while covering the entire bagged object.

The quantity of a part of the packing material which enters and is drawn into the suction unit during suction or the speed at which such draw-in occurs varies depending on types of packing materials or surface states thereof. In the technique discussed in Japanese Patent Application Laid-Open No. 2014-213395, if the suction unit performs an operation such as a shifting movement immediately after suction is interrupted, the suction unit may throw out a target packaged object.

SUMMARY

Aspects of the present disclosure are generally directed to allowing stably attracting, by suction, and conveying a packaged object in which an object is packed with a packing material According to an aspect of the present disclosure, an information processing apparatus to output control information for controlling a suction device configured to suction a packaged includes an input unit configured to input an image obtained by performing image capturing of a surface of the packaged object, and an output unit configured to output the control information to control timing at which suction is started by the suction device, based on a state of the surface of the packaged object specified from the image.

Further features of the present disclosure will become apparent from the following description of exemplary embodiments with reference to the attached drawings.

BRIEF DESCRIPTION OF THE DRAWINGS

FIG. 2 is a diagram illustrating a functional configuration example of an information processing apparatus according to the first exemplary embodiment.

FIG. 5 is a diagram illustrating a functional configuration example of the information processing apparatus according to the first exemplary embodiment.

FIG. 9 is a diagram illustrating a functional configuration example of the information processing apparatus according to the second exemplary embodiment.

FIG. 11 is a diagram illustrating a functional configuration example of an information processing apparatus according to a third exemplary embodiment.

FIG. 17 is a diagram used to explain processing which a determining unit performs in the first exemplary embodiment.

FIG. 18 is a diagram used to explain timing at which to perform suction in each exemplary embodiment of the present disclosure.

FIGS. 19A and 19B are diagrams used to explain requests in the first exemplary embodiment and the second exemplary embodiment, respectively.

DESCRIPTION OF THE EMBODIMENTS

Figure 1A:
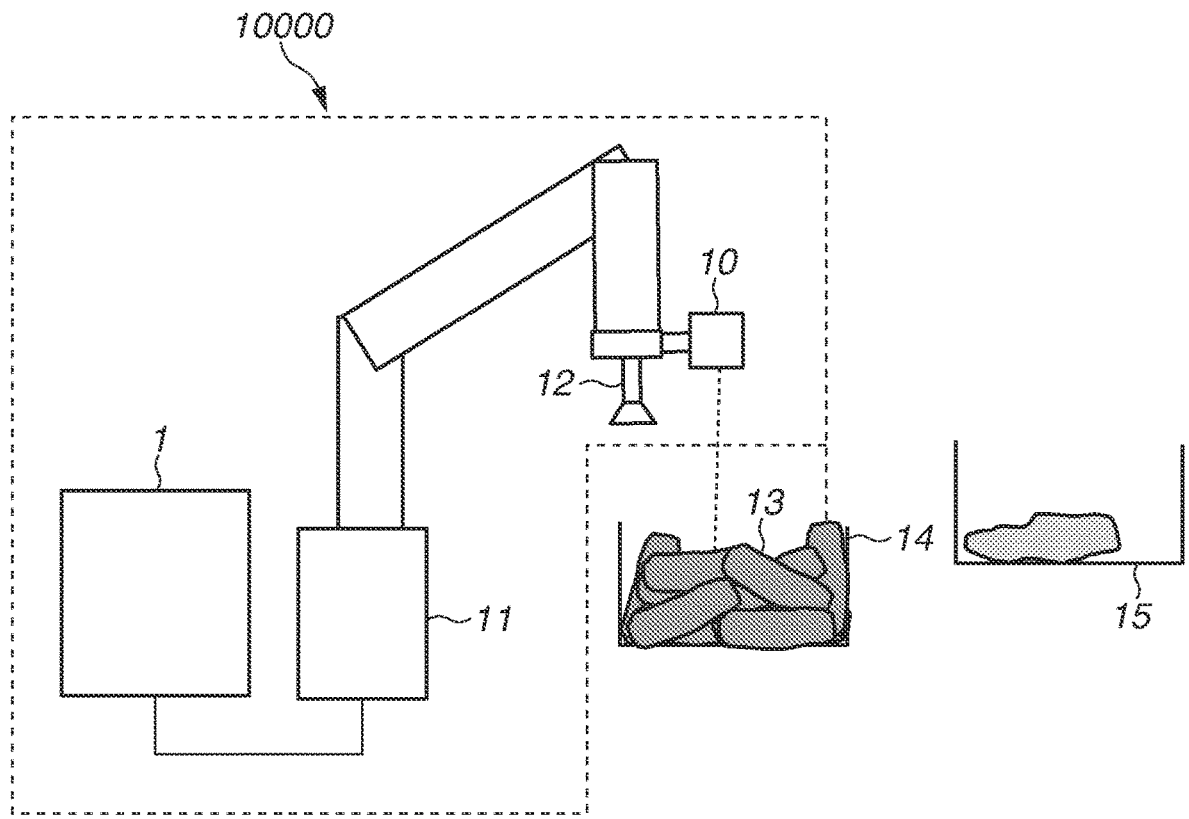
FIGS. 1A and 1B are diagrams illustrating configuration examples of an information processing system according to a first exemplary embodiment and a second exemplary embodiment, respectively.

Prior to description of exemplary embodiments of the present disclosure, the definition of terms is described.

The term "packing material" refers to, for example, plastic (vinyl), nylon, paper, and cloth. The term "packaged object" refers to an object packed with a packing material. For example, the packaged object is, for example, a cable put in a plastic (vinyl) bag, bagged potato chips, or a wrapped suitcase.

Terms as used in the following exemplary embodiments are further described with reference to FIG. 18. FIG. 18 is a diagram illustrating, in a time-series manner, a task of conveying a packaged object 13 to a destination container 15 with a picking machine of the suction type. An information processing apparatus in each of the exemplary embodiments determines suction parameters for controlling timing at which the picking machine performs suction based on a state of the surface of the packaged object. The suction parameters (denoted by Pk) are, specifically, three parameters, i.e., timing (denoted by P1) at which to start suction, a time (denoted by P2) for which to keep a suction pad at rest after the packaged object is attracted by suction, and a time (denoted by P3) for which to keep the suction pad at rest after suction is stopped. In other words, the suction parameters are control values for determining a method concerning suction of a packaged object. The information processing apparatus controls timing of suction control according to the suction parameters. In the exemplary embodiments, the suction parameters are parameters which vary depending on a state of the surface of the packaged object. Furthermore, any one of the parameters P1, P2, and P3 can be determined regardless of a state of the surface of the packaged object. In that case, that parameter is determined based on a previously fixed parameter or a value set by the user.

The timing at which to start suction (P1) is a parameter for determining, in performing suction, whether to start suction after bringing the suction pad into contact with the packaged object or to start suction before bringing the suction pad into contact with the packaged object and then moving the suction pad closer to the packaged object while performing suction. In FIG. 18, "T=T1" represents the time at which the suction unit 12 and the packaged object 13 come into contact with each other, and ΔT represents any given minute time. In the case of "P1=0", suction is started before the suction unit and the packaged object come into contact with each other (T=T1−ΔT), and, in the case of "P1=1", suction is started after those come into contact with each other (T=T1). Accordingly, the timing at which to start suction is a parameter indicating one of two values including timing before contact and timing at the time of contact. For example, in a case where the surface of a packaged object has no wrinkles and the suction pad is easy to bring into close contact with the surface of the packaged object, suction is started after those come into contact with each other (timing at the time of contact), so that it is easy to make suction successful. On the other hand, there is a case where the surface of a packaged object has wrinkles and a vacuum leak occurs even when the suction pad is pressed against the surface of the packaged object. In this case, suction is started first and the suction pad comes closer to the packaged object while performing suction (timing before contact), so that a wrinkled portion of the packing material is suctioned and drawn into the suction pad to avoid the occurrence of any vacuum leak, and, therefore, it is easy to make suction successful.

The term "first rest time" is a time for which to keep the suction pad at rest after the suction pad attracts the packaged object by suction. In other words, the first rest time is a parameter representing a time from when, in performing suction, the suction pad is brought into contact with the packaged object to when the motion of lifting up the packaged object for conveyance is started. In FIG. 18, a scene 182 obtained at "T=T1" represents the behavior of the suction unit 12 and the packaged object 13 having come into contact with each other. If the time at which to start conveyance is set to T2, the time P2 becomes equal to "T2−T1". For example, the time P2 can take consecutive values, such as 0 seconds, 0.1 seconds, 0.5 seconds, and 1.0 seconds. In a case where the packing material is thin and soft or a case where the packing material has wrinkles, the packing material is likely to move even when the suction pad suctions the packaged object while being in contact therewith, so that a vacuum leak may occur unless the packaged object is lifted up after being kept at rest for a relatively long time. On the other hand, in a case where the packing material is unlikely to move, even when the suction pad suctions the packaged object after coming into contact with the packaged object, the packaged object is able to be lifted up immediately.

The term "second rest time" is a time for which to keep the suction pad at rest after the suction pad stops suction. In other words, the second rest time is a time from, in releasing the packaged object at the conveyance destination thereof (stopping suction to release the packaged object from the suction pad and put the packaged object), when the suction pad stops suction to when the suction pad starts a motion to perform a next task. In FIG. 18, a scene 184 obtained at "T=T3" represents a behavior in which conveying the packaged object 13 to the destination container 15 has been completed. In this state, the suction pad is kept at rest for P3 seconds from the time T3. For example, the time P3 can take consecutive values, such as 0 seconds, 0.1 seconds, 0.5 seconds, and 1.0 seconds. In the case of releasing a packaged object which is likely to be drawn into the suction pad, a packing material drawn into the suction pad may prevent the packaged object from being immediately separated from the suction pad even when suction is stopped. If an operation for a next task is started before the packaged object is separated from the suction pad, the suction pad may throw away the packaged object.

Furthermore, a parameter for controlling the position and orientation of the suction unit is referred to as a "control parameter". The control parameter is determined based on the position and orientation of the suction unit, the position and orientation of a packing material (an object to be conveyed), and the position of a conveyance destination, and is assumed to be distinguished from the suction parameters. In other words, the control parameter is a parameter used for an actuator unit 11 to perform movement control of the suction unit 12.

A first exemplary embodiment is described about a case where an information processing apparatus performs a task of attracting, by suction, and taking out packaged objects one by one from a container in which a plurality of packaged objects is stacked in piles, and then conveying and putting each packaged object to a predetermined position. To attract a packaged object by suction, it is necessary for a suction pad to suction the packaged object, which is a conveyance target, while being in close contact with the packaged object so as to prevent a vacuum leak from occurring due to leaking-in of air for suction. For example, even when the suction pad is pressed against an area in which a plastic (vinyl), which is a packing material of the packaged object, is wrinkled and, then, the suction pad suctions the plastic (vinyl), a vacuum leak occurs from the area in which the plastic (vinyl) is wrinkled, so that the suction pad cannot attract the packaged object by suction. On the other hand, when the suction pad starts suction before coming into close contact with the packaged object and the suction pad comes closer to the packaged object while performing suction, if the packing material of the packaged object is a thin and soft material, the packing material is drawn into the suction pad, so that the suction pad can attract the packaged object by suction. Moreover, even packaged objects of the same type vary in the state of the surface thereof (the quantity of wrinkles thereof).

Varying timing for suction according to the quantity of wrinkles allows more stably performing suction. Therefore, the first exemplary embodiment obtains three suction parameters, i.e., the timing for starting suction, the first rest time, and the second rest time, based on information about the state of the surface of a packing material and controls suction based on the three suction parameters, thus performing suction and conveyance in a stable manner. The first exemplary embodiment is described while being divided into an execution mode and a learning mode. Furthermore, the timing for starting suction is timing at which suction is started by a suction device, and includes a case where suction is started before the suction device and the packaged object come into contact with each other and a case where suction is started after those come into contact with each other. The first rest time represents a time from when the suction device and the surface of the packaged object come into contact with each other to when conveyance is started by the suction device. The second rest time represents a time from when, after conveying the packaged object to the conveyance destination, the suction device stops suction to when the suction device starts a shifting movement. As the suction device stops suction, the packaged object separates from the suction device. First, processing for the execution mode, which determines suction parameters and performs suction and conveyance based on the determined suction parameters, is described. FIG. 1A is a diagram illustrating a configuration of an information processing system 10000 in the first exemplary embodiment. The information processing system 10000 includes an information processing apparatus 1, an imaging unit 10, an actuator unit 11, and a suction unit 12. The information processing system 10000 controls the actuator unit 11, which is a robot arm, based on image information obtained by the imaging unit 10, which is attached to the actuator unit 11, performing image capturing. Then, the information processing system 10000 performs a task of causing the suction unit 12, which is attached to the fore-end portion of the actuator unit 11, to attract, by suction, a packaged object 13 placed in a container 14 and convey the packaged object 13 to a container 15, which is a conveyance destination. Furthermore, the fore-end portion of the suction unit 12 is formed into a suction surface called a suction pad, and can take various shapes. Moreover, with regard to the pressure in the suction unit 12, a pressure meter (not illustrated) measures a vacuum pressure inside the suction pad and the information processing apparatus 1 is able to acquire a result of measurement by the vacuum meter.

FIG. 2 is a diagram illustrating a functional configuration example of the information processing apparatus 1 in the first exemplary embodiment. The information processing apparatus 1 includes an input unit 200, an extraction unit 201, a determining unit 202, a control unit 203, and a retention unit 205. The control unit 203 includes an actuator control unit 2031 and a suction control unit 2032. The input unit 200 is connected to the imaging unit 10, the actuator control unit 2031 is connected to the actuator unit 11, and the suction control unit 2032 is connected to the suction unit 12. However, FIG. 2 merely illustrates an example of the functional configuration, and is, therefore, not intended to limit the applicable scope of the present disclosure. The imaging unit 10 captures a color image and a distance image of a scene in which packaged objects and a container are shown. Thus, the imaging unit 10 to be used includes, for example, a stereo camera and an RGB-depth (RGB-D) camera. In the first exemplary embodiment, for example, the imaging unit 10 captures the image of a scene in which the packaged object 13 and the container 14 are included, thus outputting a color image and a distance image. The input unit 200 inputs an image obtained by capturing the image of a packaged object which is conveyed. The input unit 200 inputs a color image and a distance image of the scene obtained by the imaging unit 10 performing image capturing, and outputs the input color image and distance image to the extraction unit 201.

The extraction unit 201 extracts a suction position, at which to cause the suction unit 12 to attract the packaged object by suction, by comparing a template, which is an image feature in which the state of the surface of the packaged object and the position adapted for suction are associated with each other, with the input images. In other words, the extraction unit 201 extracts the position at which to cause the suction device to attract the packaged object by suction, based on the color image or distance image input by the input unit 200. Here, the extraction unit 201 extracts the position of the center of mass of the packaged object with use of pattern matching using a template. A specific example of acquiring the suction position is described below. The extraction unit 201 outputs information about the acquired suction position to the determining unit 202 and the actual control unit 2031.

The determining unit 202 determines timing from the state of the surface of the packaged object based on data in which a result indicating whether suction is successful is associated with a combination of the state of the surface of the packaged object and timing for controlling suction. More specifically, the determining unit 202 extracts suction parameters based on a packing material suction feature database retained by the retention unit 205, in an image region corresponding to the suction position input by the extraction unit 201. Here, the state of the surface of the packaged object represents the quantity of wrinkles present on the surface of the packaged object. The packing material suction feature database is described below. Moreover, a specific processing operation is also described below. The determining unit 202 outputs the extracted suction parameters to the suction control unit 2032. Moreover, the determining unit 202 determines a control parameter for controlling the shifting movement of the suction unit 12. The control parameter is determined based on the position and orientation of the suction unit 12 and the position of the container 14 or the container 15.

The control unit 203 controls the suction unit 12 according to the suction parameters or the control parameter determined by the determining unit 202. The control unit 203 includes the actuator control unit 2031 and the suction control unit 2032. The actuator control unit 2031 controls the actuator unit 11 according to the suction parameters or the control parameter. In other words, the actuator control unit 2031 controls the actuator unit 11 to perform control to attract, by suction, and convey the packaged object 13 based on the suction position input by the extraction unit 201. Moreover, during suction, the actuator control unit 2031 performs control of, for example, timing for suction in cooperation with the suction control unit 2032. The suction control unit 2032 controls suction by setting the timing for starting suction in attracting the packaged object 13 by suction, the first rest time, and the second rest time according to the suction parameters input by the determining unit 202. Moreover, the suction control unit 2032 performs control of suction which is performed by the suction unit 12 according to the suction parameters so as to attract the packaged object 13 by suction, in cooperation with the actuator control unit 2031. The retention unit 205 retains a packing material suction feature database and feature filters corresponding thereto, which the determining unit 202 uses, and outputs information about the database and the feature filters to the determining unit 202. Furthermore, the filter refers to a matrix or processing for calculating changes of a feature quantity in an image.

A concept of processing which is performed by the determining unit 202 is described with reference to FIG. 17. First, the determining unit 202 acquires an image patch 170, which is a color image patch, and an image patch 171, which is a distance image patch, in an image region corresponding to the suction position input by the extraction unit 201. Furthermore, the image patch 170 is an image obtained by capturing the image of the suction position of the packaged object 13, showing a condition in which there are two wrinkles on the surface of the packing material. The image patch 171 is an image in which distance values obtained from a distance sensor or a parallax image are associated with the respective pixels of the image in an image region corresponding to the image patch 170. The packing material suction feature is data in which a result of determination of success or failure of suction and conveyance is associated with a combination of an image patch and suction parameters in the region of an image patch (an image portion obtained by partially clipping a target image which a packing material is shown in the captured image. In other words, the packing material suction feature is data indicating suction parameters (timing concerning suction) adapted for the state of the surface of a given packaged object. Moreover, a gathering of a large number of pieces of such data collected is referred to as a "packing material suction feature database". When a feature filter 172, which extracts characteristics of a packing material with respect to a group of patches of the packing material suction feature database, is applied to the image patch 170 or the image patch 171, a group of feature vectors is obtained. With this, with regard to the image patch 170, the determining unit 202 acquires the state of the surface of the packaged object as a feature vector 1730-1. The feature vector 1730-1 is a vector representing the state of the surface of the packing material (in a feature space). The determining unit 202 associates suction parameters and a result of determination with a feature vector group 1731-1 in which the same or similar feature vectors are gathered together. Then, with respect to the feature vectors, the determining unit 202 selects values of suction parameters which have a high percentage of the result of determination being success, thus being able to obtain suction parameters according to which the result of determination is likely to become success. For example, the determining unit 202 clusters groups of feature vectors having such a feature that there are no wrinkles on the surface of the packaged object into feature vector groups 1731-1, 1731-2, 1731-3, . . . , and 1731-$k$. Moreover, a space composed of such a plurality of feature vector groups is referred to as a "feature vector space 173". The feature vector space 173 can be divided into a feature vector subspace 174 for every feature of the surface of the packaged object. For example, the feature vector subspace 174 is a one-dimensional space with the quantity of wrinkles set as an axis. Moreover, a group of feature vectors can be expressed by a plane such as a plane 175 by adding another axis or aggregating feature vectors. In this way, the determining unit 202 changes control of the timing for starting suction performed by the suction device or the timing for performing a shifting movement thereof. For example, when the quantity of wrinkles included in the surface of the image is larger than a predetermined threshold value, the determining unit 202 makes a change in such a manner that suction performed by the suction device is started before the suction device comes into contact with the packaged object. Thus, as the quantity of wrinkles is larger, the determining unit 202 makes the timing for starting suction earlier. Specifically, since a packing material with large quantity of wrinkles is predetermined or expected to be soft, performing suction early causes the packing material to be attracted by suction in such a way as to be drawn into the suction pad. This decrease the probability of the packing material falling from the suction pad. On the other hand, since a hard packing material is predetermined or expected to have a small quantity of wrinkles on the surface thereof, the determining unit 202 makes the timing for starting suction late. With regard to the feature filter for extracting characteristics of the packing material, for example, the density of edges expresses the likelihood of occurrence of wrinkles of the packing material, in other words, the softness or thickness of the packing material, and the ratio in luminance or saturation between an area in which the packing material has overlapping portions and an area in which the packing material has no overlapping portions expresses the transmittance or thickness of the packing material. Preparing such a feature filter allows extracting a feature vector representing characteristics of the packing material. For example, in the case of specifically obtaining the number of wrinkles, the determining unit 202 extracts lines of wrinkles with use of, for example, a Sobel filter, a Laplacian filter, or a Canny filter for extracting edges.

Specific examples of the result of determination of success or failure in the packing material suction feature database are described. There are three results of determination, i.e., results indicating whether the vacuum pressure has decreased to a threshold value or less when the suction device is suctioning an object to be conveyed while being in contact with the object, whether the suction device has been able to attract, by suction, an object to be conveyed and lift the object, and whether the suction device has been able to convey an object to be conveyed to the conveyance destination. With respect to each of the three results of determination, a result of success or failure for every value of suction parameter is supplied as much as the number of pieces of packing material suction feature data. Additionally, these three results of determination of success or failure respectively correspond to the timing for starting suction, the first rest time, and the second rest time in the suction parameters. For example, with regard to data about a given packing material suction feature, consider a result of determination of success or failure corresponding to the value of the timing for starting suction (P1). The result of determination of success or failure corresponding to the value P1 is determined based on whether the vacuum pressure has decreased to a threshold value or less when the suction device is suctioning the packaged object while being in contact with the packaged object, and, if the vacuum pressure has decreased to the threshold value or less, the determining unit 202 determines that the value of the timing for starting suction in the suction parameters is appropriate. Therefore, in the packing material suction feature database, if a feature vector corresponding to an image patch is determined, with respect to the respective suction parameters, the value which has the highest percentage of the number of pieces of success data from among the percentages of the number of pieces of success data and the number of pieces of failure data can be set as a suction parameter.

While, in the example described here, three results of determination of success or failure individually correspond to respective three suction parameters, the present exemplary embodiment is not limited to this example. For example, only when all of the three results of determination of success or failure indicate success, it can be determined that a combination of three suction parameters corresponding thereto is appropriate.

Figure 3:
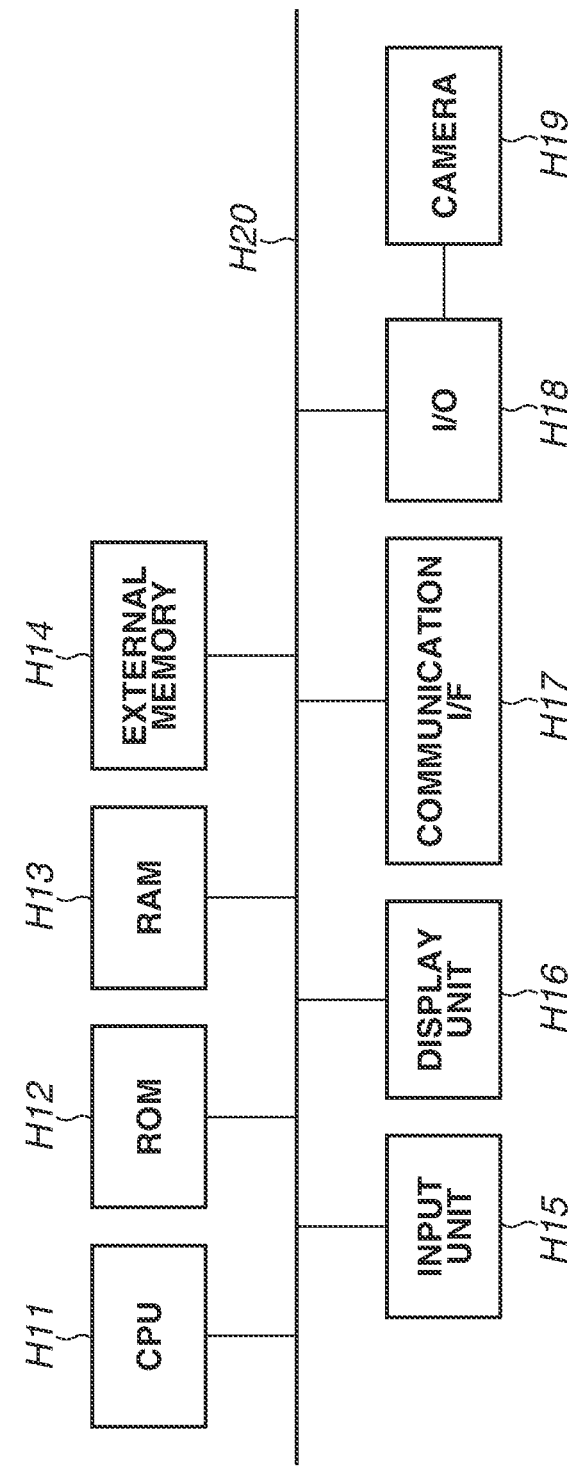
FIG. 3 is a diagram illustrating a hardware configuration of the information processing apparatus according to the first exemplary embodiment.

FIG. 3 is a diagram illustrating a hardware configuration of the information processing apparatus 1. A central processing unit (CPU) H11 controls various devices connected to a system bus H20. A read-only memory (ROM) H12 stores programs of a Basic Input/Output System (BIOS) and a boot program. A random access memory (RAM) H13 is used as a main storage device for the CPU H11. An external memory H14 stores programs according to which the information processing apparatus 1 performs processing. An input unit H15, which is a touch panel, a keyboard, a mouse, or a robot controller, performs processing concerning inputting of, for example, information. A display unit H16 outputs, to a display device, a result of calculation performed by the information processing apparatus 1 according to an instruction from the CPU H11. Furthermore, the display device can be any type of display, such as a liquid crystal display device, a projector, or a light-emitting diode (LED) indicator. A communication interface H17 performs information communication via a network with use of any type of communication method, such as Ethernet, Universal Serial Bus (USB), serial communication, or wireless communication. An input-output (I/O) unit H18 is connected to a camera H19. Furthermore, the camera H19 is equivalent to the imaging unit 10.

In the first exemplary embodiment, the imaging unit 10 is attached to the actuator unit 11. When the position and orientation available for suction have been determined on an image captured by the imaging unit 10, in order to move the actuator unit 11 to the determined position, a relationship between the coordinate system of the actuator unit 11 and the coordinate system of the imaging unit 10 is assumed to be calibrated in advance and a parameter with six degrees of freedom is assumed to be previously obtained. This parameter is expressed by a rotation matrix and a translation vector which represent a relationship of the coordinate system of the imaging unit 10 (camera H19) relative to the coordinate system of the robot, and the rotation matrix has three degrees of freedom and the translation vector has three degrees of freedom. Similarly, the suction unit 12 is attached to the fore-end of the actuator unit 11. In order to move the suction unit 12 to an intended or a predetermined position, a relationship between the coordinate system of the actuator unit 11 and the coordinate system of the suction unit 12 is assumed to be calibrated in advance and a parameter with six degrees of freedom is assumed to be previously obtained.

Figure 15:
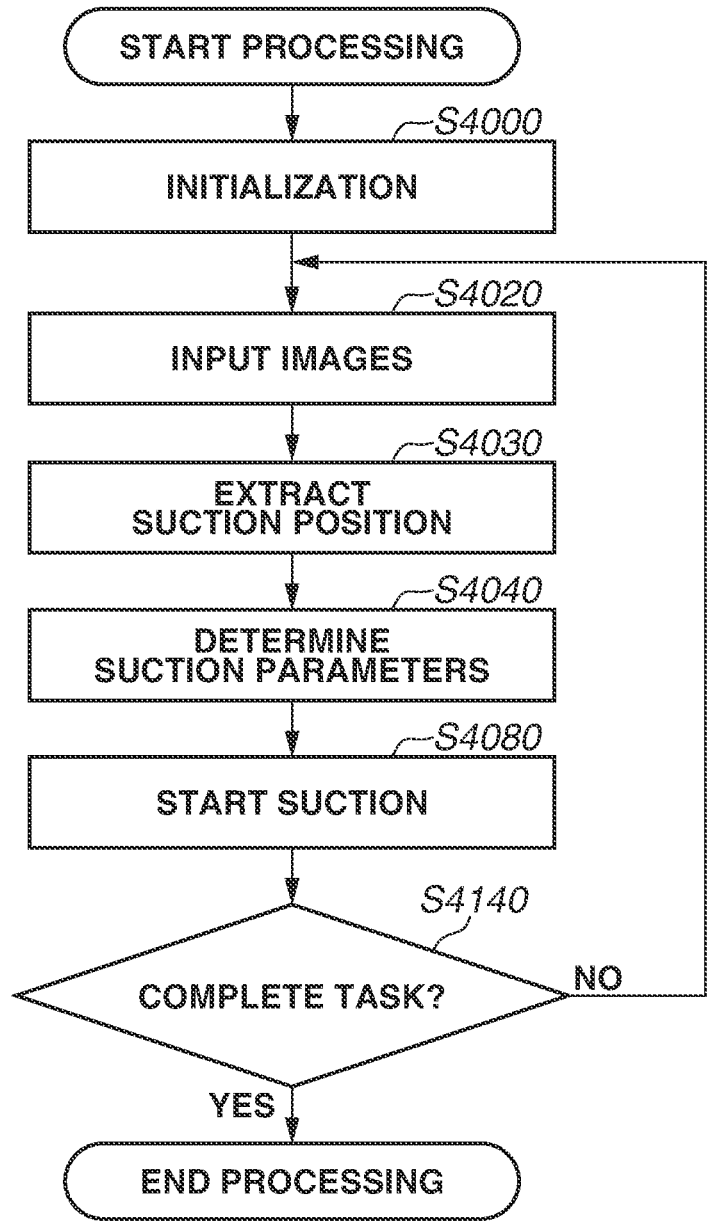
FIG. 15 is a flowchart illustrating a processing procedure which the information processing apparatus performs according to the first exemplary embodiment.

Next, a processing procedure in the first exemplary embodiment is described. First, processing which the information processing apparatus 1 performs is described briefly, and, then, a specific example of the processing is described below with reference to flowcharts for the information processing system. FIG. 15 is a flowchart illustrating a processing procedure which the information processing apparatus 1 performs. In step S4000, the information processing apparatus 1 performs initialization of parameters. In step S4020, the input unit 200 inputs an image captured by the imaging unit 10. In step S4030, the extraction unit 201 extracts a suction position for the packaged object 13 from the input image. In step S4040, the determining unit 202 determines suction parameters from the state of the surface of a packing material used for packing of the packaged object 13 based on the input image. In step S4080, the control unit 203 performs control to cause the suction unit 12 to start suction. In step S4140, the information processing apparatus 1 determines whether the task has been completed, and, if it is determined that the task has been completed (YES in step S4140), the processing ends and, if it is determined that the task has not been completed (NO in step S4140), the processing returns to step S4020.

Figure 4:
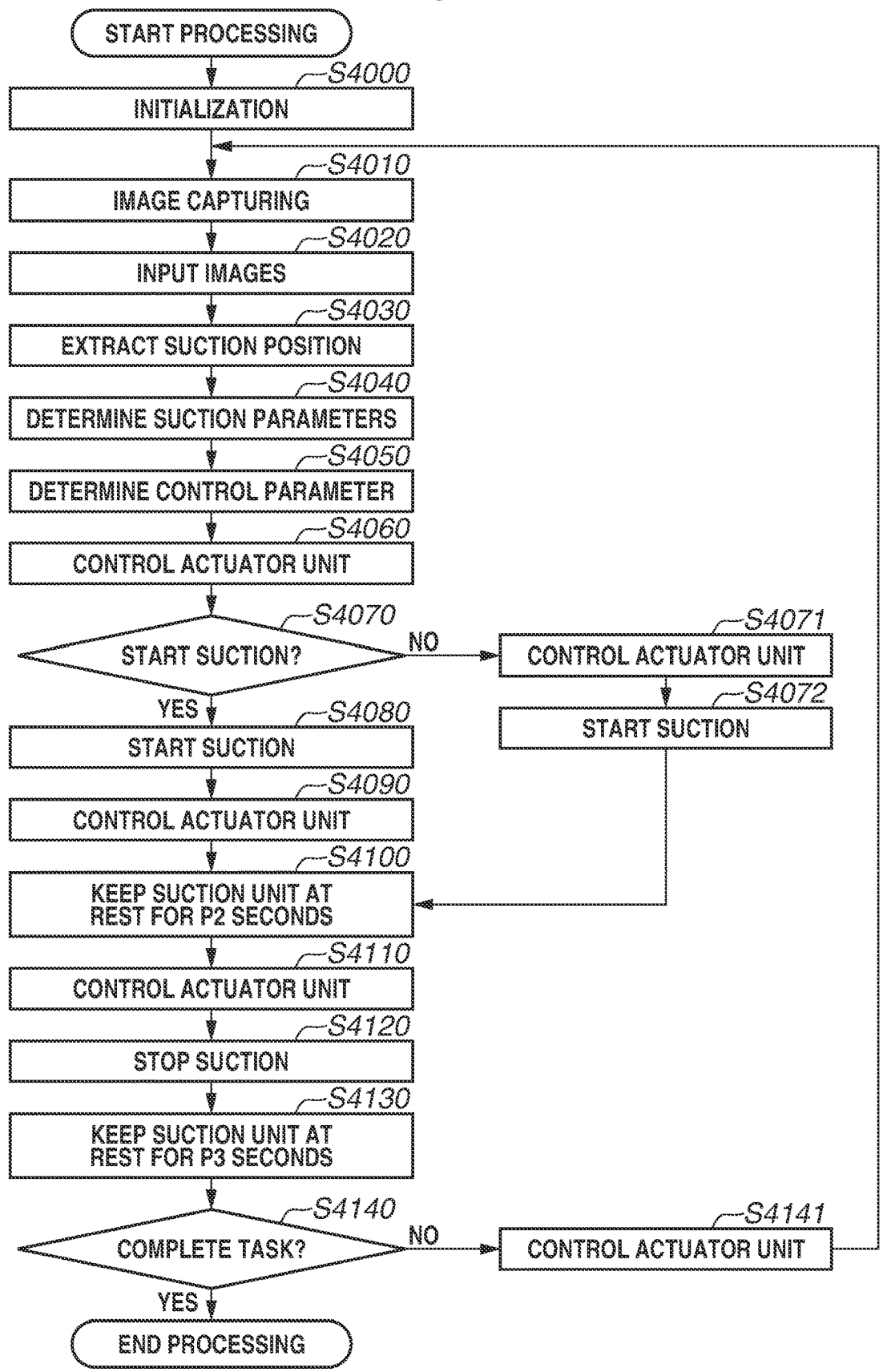
FIG. 4 is a flowchart illustrating a processing procedure which the information processing system performs according to the first exemplary embodiment.

FIG. 4 is a flowchart illustrating a processing procedure which the information processing system 10000 including the information processing apparatus 1 performs in the first exemplary embodiment. However, the information processing system 10000 does not necessarily need to perform all of the steps described in this flowchart.

In step S4000, the information processing system 10000 performs initialization of the system. More specifically, the information processing system 10000 reads programs from the external memory H14, thus bringing the information processing apparatus 1 into the state of being able to operate. The information processing system 10000 performs start-up of the imaging unit 10 and the actuator unit 11, reading of parameters therefor, and reading of calibration information about the imaging unit 10, the actuator unit 11, and the suction unit 12, and uses internal parameters (for example, the focal length, image center position, and lens distortion) for the imaging unit 10, which have been calibrated in advance. Moreover, the information processing system 10000 reads positions of the container 14 and the container 15. Additionally, the information processing system 10000 reads a feature filter corresponding to the packing material suction feature database from the retention unit 205, applies the feature filter to a group of image patches in the packing material suction feature database, and previously obtains feature vectors corresponding to the image patches. Then, the information processing system 10000 classifies the feature vectors for every same or similar feature vector, refers to a result of determination of success or failure with respect to each feature vector, and associates a suction parameter which is likely to cause success with each feature vector. Moreover, before performing image capturing, the information processing system 10000 causes the actuator control unit 2031 to control the actuator unit 11 based on the calibrated position, thus moving the imaging unit 10 to such a position as to be able to capture an image of the packaged object 13 put in the container 14.

In step S4010, the imaging unit 10 performs image capturing of the packaged object 13 put in the container 14, thus obtaining a color image and a distance image. In step S4020, the input unit 200 inputs images obtained by performing image capturing of the packaged object. More specifically, the input unit 200 inputs a color image and a distance image obtained by image capturing in step S4010 to the extraction unit 201. The input unit 200 can acquire a grayscale image or an infrared image as long as it is available for observing the surface of the packing material. In step S4030, the extraction unit 201 extracts a suction position at which to cause the suction device to attract the packaged object by suction. Specifically, the extraction unit 201 extracts the position of the packaged object by comparing a template indicating features of the packaged object (image feature) and the images extracted in step S4010 with each other. Data about the suction position (the position of the center of mass of the object) is allocated for each template. More specifically, the extraction unit 201 extracts, from the color image, an image feature for detecting the packaged object 13 stacked in piles in the container 14, and performs matching of the image feature with a template indicating the feature of the packaged object 13, thus specifying the suction position for the packaged object 13. Here, the template is data in which, after the packaged object 13 and the suction position (the position of the center of mass of the object are observed in various orientations, a feature in an image is associated with the suction position for and the orientation of the packaged object 13 included in the image, and indicates that, if the feature is similar, there is a similar orientation state. Moreover, the suction position is previously determined for each template. Therefore, if a portion of the input image is matched with a template, the extraction unit 201 acquires the corresponding portion as the suction position. Furthermore, the template, which the extraction unit 201 acquires, is retained by the retention unit 205 or is retained in an external storage unit. The template can be a two-dimensional image or can be a three-dimensional model of a packaged object. Here, the extraction unit 201 acquires two-dimensional positions of a plurality of packaged objects. Additionally, in the distance image (three-dimensional information) acquired in step S4010, the extraction unit 201 identifies the position of a packaged object which does not interfere with another packaged object, and three-dimensionally extracts the orientation of the packaged object from the distance image. Then, the extraction unit 201 extracts a suction candidate area of the packaged object in which a surface available for suction is present (a result of extraction). More specifically, the extraction unit 201 sets, as the suction candidate area, a result of extracting a two-dimensional position of the packaged object by comparing a region in which the packaged object is present with the image feature of the packaged object and further extracting three-dimensional positions of a plurality of packaged objects which the suction unit is able to attract by suction with use of depth information about the distance image. By using the three-dimensional positions of packaged objects, the extraction unit 201 is able to determine the position used for suction with a high degree of accuracy. In the distance image, the extraction unit 201 identifies the position of a packaged object 13 which is present on the near side among packaged objects 13 stacked in piles and which does not interfere with another packaged object, and three-dimensionally obtains the orientation of the packaged object 13. In other words, the extraction unit 201 determines, as the suction position, a suction candidate area which has the smallest value indicating the depth from the imaging unit 10 among a plurality of packaged objects. Since sequentially attracting, by suction, a pile of packaged objects one by one in order from the upper one allows preventing unpiling of packaged objects, it is possible to perform stable suction. Furthermore, the method of extracting the suction position is not limited to the above-mentioned method.

In step S4040, the determining unit 202 determines suction parameters from the state of the surface of the packaged object based on data in which a result indicating whether suction is successful is associated with a combination of the state of the surface of the packaged object and timing for suction. The determining unit 202 determines suction parameters in the suction position acquired in step S4030 and its surrounding portion with use of the color image, the distance image, and the packing material suction feature database. Specifically, first, the determining unit 202 extracts an image patch of the color image or the distance image at the suction position and its surrounding portion. At this time, the determining unit 202 sets, based on the distance image, the size of the image patch in such a way as to become a square with a size into which the diameter of the suction pad fits in actual size. Since only an area against which the suction pad is actually pressed (a size into which the diameter of the suction pad fits) has a large influence over the estimation of suction parameters, the determining unit 202 adjusts the size of the image patch to the diameter of the suction pad. Since the image patch acquired in such a way as to be adjusted to the actual size varies in pixel size according to distances, the determining unit 202 enlarges or reduces the image patch by resizing in such a way as to have a predetermined size. For example, the determining unit 202 resizes the image patch to 64 pixels in horizontal and vertical directions. Then, the determining unit 202 applies the feature filter to the resized image patch, thus obtaining a feature vector. Next, the determining unit 202 performs comparison of the feature vector with those in the packing material suction feature database. If a similar feature vector is found, the determining unit 202 extracts a suction parameter that is likely to cause success which is associated with the found similar feature vector, thus obtaining suction parameters. While, here, an example using a color image and a distance image has been described, the present exemplary embodiment is not limited to this example, but the determining unit 202 can perform comparison with the packing material suction feature database with use of any one of a color image and a distance image. Moreover, besides a color image, the determining unit 202 can use, for example, a monochroic image, an infrared image, or an ultraviolet image, can use a plurality of images obtained by performing image capturing of the suction position from various viewpoints, or can use an image obtained by projecting pattern light and performing image capturing from the reflected pattern light. In either case, a packing material suction feature database of the format which is available for comparison with an input is assumed to be previously prepared. While, here, an example in which the size of the image patch is 64 pixels in horizontal and vertical directions has been described, the present exemplary embodiment is not limited to this example.

In step S4050, the determining unit 202 determines a control parameter based on the initial position of the suction unit 12 and position information about the packaged object 13 and the container 15. The control parameter is a parameter used for the actuator unit 11 to perform movement control of the position of the suction unit 12. For example, the determining unit 202 determines, as a control parameter, control for moving the suction unit 12 to the position of the packaged object 13. In step S4060, the actuator control unit 2031 controls the actuator unit 11 according to the control parameter determined in step S4050 in such a manner that the suction unit 12 arrives at the vicinity of the suction position input by the extraction unit 201. In step S4070, the information processing apparatus 1 performs determination by referring to the timing P1 for starting suction out of the suction parameters obtained by the suction control unit 2032. If it is determined that suction is to be started in first (P1=0) (YES in step S4070), the processing proceeds to step S4080. On the other hand, if it is determined that suction is to be performed after contact with the packaged object (P1=1) (NO in step S4070), the processing proceeds to step S4071. In step S4080, the suction control unit 2032 performs control to cause the suction unit 12 to start suction. In step S4090, the actuator control unit 2031 controls the actuator unit 11 according to the control parameter determined in step S4050 in such a way as to cause the suction unit 12 to come into contact with the packaged object 13 while suctioning the packaged object 13. Then, the processing proceeds to step S4100. In step S4071, the actuator control unit 2031 controls the actuator unit 11 according to the control parameter determined in step S4050 in such a way as to cause the suction unit 12 to come into contact with the packaged object 13. In step S4072, the suction control unit 2032 performs control to cause the suction unit 12 to start suction. At this time, the suction unit 12 is in the state of being in contact with the packaged object 13. Then, the processing proceeds to step S4100. Furthermore, while the suction unit 12 is able to arrive at the suction position for the packaged object 13 by being controlled according to the control parameter determined in step S4050, considering whether the suction unit 12 and the packaged object 13 have come into contact with ea other allows performing more stable picking. For example, an observation unit (not illustrated) can measure the vacuum pressure of the suction unit and, if the vacuum pressure has decreased to lower than a predetermined value, the observation unit can determine that the suction unit 12 and the packaged object 13 have come into contact with each other. Alternatively, a contact sensor can be mounted on a robot hand or a suction pad and such contact can be detected by a detection unit (not illustrated).

Here, a specific example of the timing for starting suction is described with reference to FIG. 18. In a graph 18, the vertical axis indicates, with regard to suction control over the suction unit 12, a state in which suction is ON and a state in which suction is OFF, and the horizontal axis indicates time. "T=0" represents timing at which a task of conveying a packaged object put in the container 14 to the container 15 has been started. "T=T1" represents timing at which the suction unit and the packaged object come into contact with each other. "T=T2" represents timing at which to start conveying the packaged object. "T=T3" represents timing at which to stop suction and release the packaged object. In a scene 180, the imaging unit 10, the suction unit 12, the packaged object (an object to be conveyed) 13, the container 14, and the remaining objects to be conveyed, which are present at the time of "T=0", are shown. Each of the imaging unit 10 and the suction unit 12 is connected to the information processing apparatus 1. The information processing apparatus 1 extracts a suction position for the packaged object 13 from the captured image. At "T=0", the imaging unit 10 performs image capturing of the packaged object 13 and the container 11. A plurality of packaged objects stacked in piles is present in the container 14, and the packaged object 13 is placed on the top of such a pile of packaged objects. In the graph 18, suction control is expressed by a solid line in a case where the suction parameter is "P1=0", and is expressed by a dashed line in a case where the suction parameter is "P11". As in a scene 181, at a time immediately before the suction unit 12 arrives at the packaged object 13 (T=T1−ΔT seconds), in a case where the suction parameter is "P1=0", suction is started at that time. In a case where the suction parameter (P1) is "P1=1", suction by the suction unit 12 is started at timing of "T=T1". As expressed by a scene 182, at timing of "T=T1", the packaged object 13 and the suction unit 12 come into contact with each other. Next, in a case where a numerical value is set as the suction parameter P2, the suction unit 12 is kept at rest for P2 seconds in the state of the scene 182 while suctioning the packaged object 13. At timing of "T=T2", which is P2 seconds after contact between the packaged object 13 and the suction unit 12, the suction unit 12 starts conveying the packaged object 13. A scene 183 represents the state in which the suction unit 12 is in the process of conveying the packaged object 13. After conveying the packaged object 13, the suction unit 12 arrives at the vicinity of the container 15, which is a destination, at timing of "T=T3". A scene 184 represents such a state at that time. Here, in a case where the suction parameter P3 is previously set, the suction 12 stops suction and is kept at rest for P3 seconds. After "T3+P3" seconds, the suction unit 12 is moved again. In this way, the information processing apparatus 1 changes timing at which to perform suction according to the determined suction parameters.

In step S4100, the actuator control unit 2031 causes the suction unit 12 to be kept at rest for the first rest time (P2 seconds) in the state of suctioning the packaged object 13 while being in contact with the packaged object 13, according to the first rest time (P2) included in the suction parameters determined in step S4040. In other words, the actuator unit 11 remains at rest for P2 seconds. Here, keeping the suction unit at rest allows sufficiently attracting the packaged object by suction because, for example, in a case where the surface of the packaged object has many wrinkles, the suction unit performs suction while being in contact with the surface of the packaged object, thus being able to draw in wrinkles and, thus, get rid of wrinkles. In step S4110, the actuator control unit 2031 controls the actuator unit 11 to convey the packaged object 13 to the container 15 according to the control parameter determined in step S4050. In step S4120, to release the packaged object 13, which the suction unit 12 has attracted by suction, to the container 15, the suction control unit 2032 performs control to stop suction performed by the suction unit 12. In step S4130, the actuator control unit 2031 causes the actuator unit 11 to be kept at rest for the second rest time (P3 seconds) after suction is stopped in step S4120, according to the second rest time (P3) included in the suction parameters. During this rest time, the packaged object 13 is completely released from the suction unit 12 to the container 15. For example, even in a case where the packing material is a somewhat soft material and is unlikely to be separated from the suction unit, keeping the suction unit at rest for a while allows improving the success rate of release.

In step S4140, the information processing apparatus 1 determines whether to complete the task, and, if it is determined to complete the task (YES in step S4140), the processing ends. If it is determined not to complete the task (NO in step S4140), the processing proceeds to step S4141. Here, the determination to complete the task is based on a case where it has become unnecessary to convey any further packaged object from the container 14 to the container 15. For example, such a case includes the time when there has become no packaged objects in the container, the time when any further packaged object is not able to be put in the container 15, and the time when packaged objects the number of which is required by the user have been completely conveyed. In step S4141, the actuator control unit 2031 controls the actuator unit 11 in such a manner that the imaging unit 10 moves to a position and orientation available for performing image capturing of a packaged object in the container 14. Then, the processing returns to step S4010.

The above-described processing allows performing suction and conveyance of the packaged object 13 from the container 14 to the container 15. In the execution mode in the first exemplary embodiment, three suction parameters, i.e., timing for starting suction, a first rest time, and a second rest time, are determined based on information about a packing material in a position at which to attract the packaged object by suction, and suction is controlled based on the suction parameters. Therefore, it is possible to stably attract, by suction, and convey an object packaged with a packing material.

In the execution mode, a case has been described in which, when a task of taking out a packaged object in a pile of packaged objects put in a container by suction from the container and then conveying the packaged object to a predetermined position is performed, a packing material suction feature database is prepared in advance. On the other hand, in the learning mode, a case is described in which a packing material suction feature database which is retained by a retention unit is acquired by learning. An information processing system in the learning mode includes, in the information processing apparatus, a mode switching unit (not illustrated) and is thus able to switch between an execution mode, which performs a task, and a learning mode, which performs learning. Here, the learning mode is described. A configuration of the information processing system 10000 in the learning mode is similar to that illustrated in FIG. 1A in the first exemplary embodiment, and is, therefore, omitted from description.

FIG. 5 is a diagram illustrating a functional configuration example of the information processing apparatus 1 in the learning mode. The information processing apparatus 1 in the learning mode includes functional constituent elements similar to those in the execution mode illustrated in FIG. 2. More specifically, the information processing apparatus 1 illustrated in FIG. 5 includes an input unit 500, an extraction unit 501, a determining unit 502, a control unit 503, and a retention unit 505. The information processing apparatus 1 illustrated in FIG. 5 further includes a determination unit 506, a data acquisition unit 507, and a learning unit 508.

The input unit 500 inputs an image obtained by performing image capturing of a packaged object. More specifically, the input unit 500 inputs a color image and a distance image obtained by the imaging unit 10 performing image capturing of a packaged object and outputs the color image and the distance image to the extraction unit 501. The extraction unit 501 extracts a suction position, at which to cause the suction device to attract the packaged object by suction, by comparing a template, which is an image feature in which the state of the surface of the packaged object and the position adapted for suction are associated with each other, with the input images. In other words, the extraction unit 501 extracts the position at which to cause the suction unit 12 to attract the packaged object by suction, based on the color image or distance image input by the input unit 500. The extraction unit 501 outputs information about the extracted suction position to the determining unit 502 and an actuator control unit 5031. The determining unit 502 determines timing concerning suction, which indicates a time or timing at which to perform suction, based on data in which a result indicating whether suction is successful is associated with a combination of the state of the surface of the packaged object and timing concerning suction. More specifically, the determining unit 502 acquires suction parameters based on a request in the packing material suction feature database input by the retention unit 505 with respect to the suction position input by the extraction unit 501. Specifically, the determining unit 502 obtains feature vectors with use of a feature filter corresponding to the packing material suction feature database with respect to an image patch corresponding to the suction position. Then, since, in the packing material suction feature database, the value of each of three suction parameters in which data is to be acquired for each feature vector is set as a request, the determining unit 502 acquires those values as suction parameters. The determining unit 502 outputs the acquired suction parameters to a suction control unit 5032. Details of setting of a request in the packing material suction feature database are described below.

The control unit (output unit) 503 outputs control information for controlling the timing concerning suction determined from the state of the surface of the packaged object specified based on the image. In other words, the control unit 503 controls the suction unit 12 according to the timing concerning suction determined by the determining unit 502. The control unit 503 is composed of the actuator control unit 5031 and the suction control unit 5032. The actuator control unit 5031 controls the actuator unit 11 so as to perform conveyance control of the packaged object 13 while attracting the packaged object 13 by suction based on the suction position input by the extraction unit 501. Moreover, in performing control of suction, the actuator control unit 5031 performs control of, for example, timing for suction in cooperation with the suction control unit 5032. The suction control unit 5032 controls suction by setting the timing for starting suction in attracting the packaged object 13 by suction, the first rest time, and the second rest time according to the suction parameters input by the determining unit 502. Moreover, the suction control unit 5032 performs control of suction which is performed by the suction unit 12 according to the suction parameters so as to attract the packaged object 13 by suction, in cooperation with the actuator control unit 5031. The retention unit 505 retains a packing material suction feature database and feature filters corresponding thereto and outputs information about the database and the feature filters to the determining unit 502 and the learning unit 508. Moreover, in a case where the learning unit 508, which is described below, has performed additional updating of data and a request in the packing material suction feature database, the retention unit 505 performs updating of the database and the request.

The determination unit 506 determines a result indicating whether a task of conveying a packaged object is successful, by observing the vacuum pressure of the suction unit 12. The determination unit 506 makes a determination of whether a normal state is obtained at each checkpoint, and outputs a result of the determination to the data acquisition unit 507. Specific examples of the checkpoint at which the determination unit 506 makes a determination include whether the vacuum pressure has decreased to a threshold value or less when the suction unit 12 is suctioning the packaged object 13 while being in contact therewith, whether the suction unit 12 has been able to lift up the packaged object 13 after starting conveying the packaged object 13 attracted by suction (whether the vacuum pressure remains at the threshold value or less even when the suction unit 12 has risen to a lift-up position for the packaged object 13), and whether the packaged object 13 is placed within a desired or predetermined range after being released. However, the checkpoint is not limited to these examples, but only needs to include at least one of these examples. For example, in a case where the timing for starting suction is before contact, the determination unit 506 can determine whether the vacuum pressure has decreased before the suction unit 12 comes into contact with the packaged object (and stops there). In a case where, despite the timing for starting suction being before contact, the vacuum pressure has not decreased at all before contact, since it makes no sense to start suction before contact, the determination unit 506 is able to allow learning that the suction unit 12 only needs to start suction at the time of contact. The data acquisition unit 507 receives suction parameters corresponding to results of determination about suction and conveyance input by the determination unit 506, and image patches of the color image and the distance image obtained in the suction position at that time, thus collecting pieces of data. The data acquisition unit 507 integrates the collected pieces of data into a data group about packing material suction features and outputs the data group to the learning unit 508. The learning unit 508 learns timing concerning suction by imparting data about a result of the task to a combination of the state of the surface of the packaged object and the timing concerning suction. In a case where it is determined by the determination unit 506 that the vacuum pressure is lower than a predetermined value, the learning unit 508 imparts success data. In a case where it is determined by the determination unit 506 that the vacuum pressure is higher than or equal to the predetermined value, the learning unit 508 imparts failure data to the state of the surface of the packaged object. Moreover, the learning unit 508 acquires a request including suction parameters of data required for improving the database, based on the packing material suction feature database and the feature filter corresponding thereto input by the retention unit 505. Additionally, the learning unit 508 updates the packing material suction feature database and the request based on data collected by the data acquisition unit 507. Then, the learning unit 508 outputs the packing material suction feature database and the request as updated to the retention unit 505. A detailed procedure in the learning unit 508 is described below.

The request is described with reference to FIG. 19A. Image patches are converted into feature vectors with use of feature filters which are based on the packing material suction feature database. In the request, when similar feature vectors are gathered together (into a feature vector group), the value of each of three suction parameters requiring data collection for each feature vector group (in FIG. 17, 1731-1, 1731-2, 1731-3, . . . ) is set. In other words, the request is defined for each feature vector group, and binarily represents whether there is a request for data with respect to three suction parameters. For example, in FIG. 19A, with regard to the feature vector group 1731-1, data about suction parameters is requested in such a manner that data is requested when the timing for starting is before contact, data is requested when the first rest time is 0.1 seconds, and data is requested when the second rest time is 0 seconds. Next, a setting method for the request is described. First, at a stage in which there are no registrations in the packing material suction feature database, values can be selected and set at random from respective parametric spaces of three suction parameters for each gathering of feature vectors. However, in each parametric space, a suction parameter to be set is assumed to have values in a discrete manner. For example, the timing for starting suction can take two values, i.e., before contact and after contact, and the first rest tune can take values from 0.0 seconds to 1.0 seconds in increments of 0.1 seconds.

Next, processing which is performed in the state in which several pieces of data about packing material suction features are previously registered in the packing material suction feature database is described. For each gathering of feature vectors obtained in a similar way, results of determination of success or failure corresponding to respective suction parameters are mapped to suction parametric spaces. Thus, with regard to three suction parameters, frequencies of success data and failure data are obtained with respect to discrete values in the respective parametric spaces. At this time, with respect to a gathering of feature vectors, if a value having a high success rate is present in each of the suction parameters, that value can be used as a suction parameter. Here, the success rate can be calculated as the probability of success obtained when suction and conveyance are performed a predetermined number of times or more with use of the same suction parameter. In this way, if the value of a suction parameter having a high success rate is able to be found, it becomes unnecessary to set a request used for collecting data. With regard to a suction parameter in which it has become unnecessary to set a request, it is determined that data is not requested. If, at the current suction position, it is determined that, with regard to all of the suction parameters, data is not requested, the suction position is changed and data collection is performed. Next, a case where a suction parameter having a high success rate has not yet been found is described. First, in suction parameters in which success data is present, with respect to a suction parameter in which the sum of the number of pieces of success data and the number of pieces of failure data is small, the value of that suction parameter is set as a request so as to check whether increasing the number of pieces of data causes an increase in the number of pieces of success data. Then, in a case where, even when the sum of the number of pieces of success data and the number of pieces of failure data becomes greater than or equal to a threshold value Tt, the number of pieces of success data does not become larger than the number of pieces of failure data by a threshold value Td, the value of that suction parameter is determined to be a value that does not have a high success rate (an inappropriate value), and is thus excluded from being targeted as a request. With respect to a suction parameter in which the number of pieces of failure data is obviously large, the value of that suction parameter is also determined to be a value having a low success rate, and is thus excluded from being targeted as a request. With regard to a case where there is a plurality of suction parameters for which data collection is not yet attempted, such as suction parameters in which neither success data nor failure data is yet obtained, the value of a suction parameter in which success data is present nearby in a suction parametric space is configured to be preferentially set as a request. Alternatively, value of a suction parameter in which no failure data is present nearby is configured to be preferentially set as a request. In this way, with respect to a gathering of feature vectors, until one or more sets of appropriate suction parameters are obtained, the value of a suction parameter included in suction parameters that are not excluded is set as a request, and data therefor is collected. However, it is not always necessary to obtain suction parameters with respect to all of the feature vectors. For example, with regard to a feature vector which seldom appears in a given suction and conveyance task, an appropriate suction parameter does not need to be obtained. Moreover, the setting method for a request is not limited to the above-described method. For example, values can be always set in a random manner.

Figure 6B:
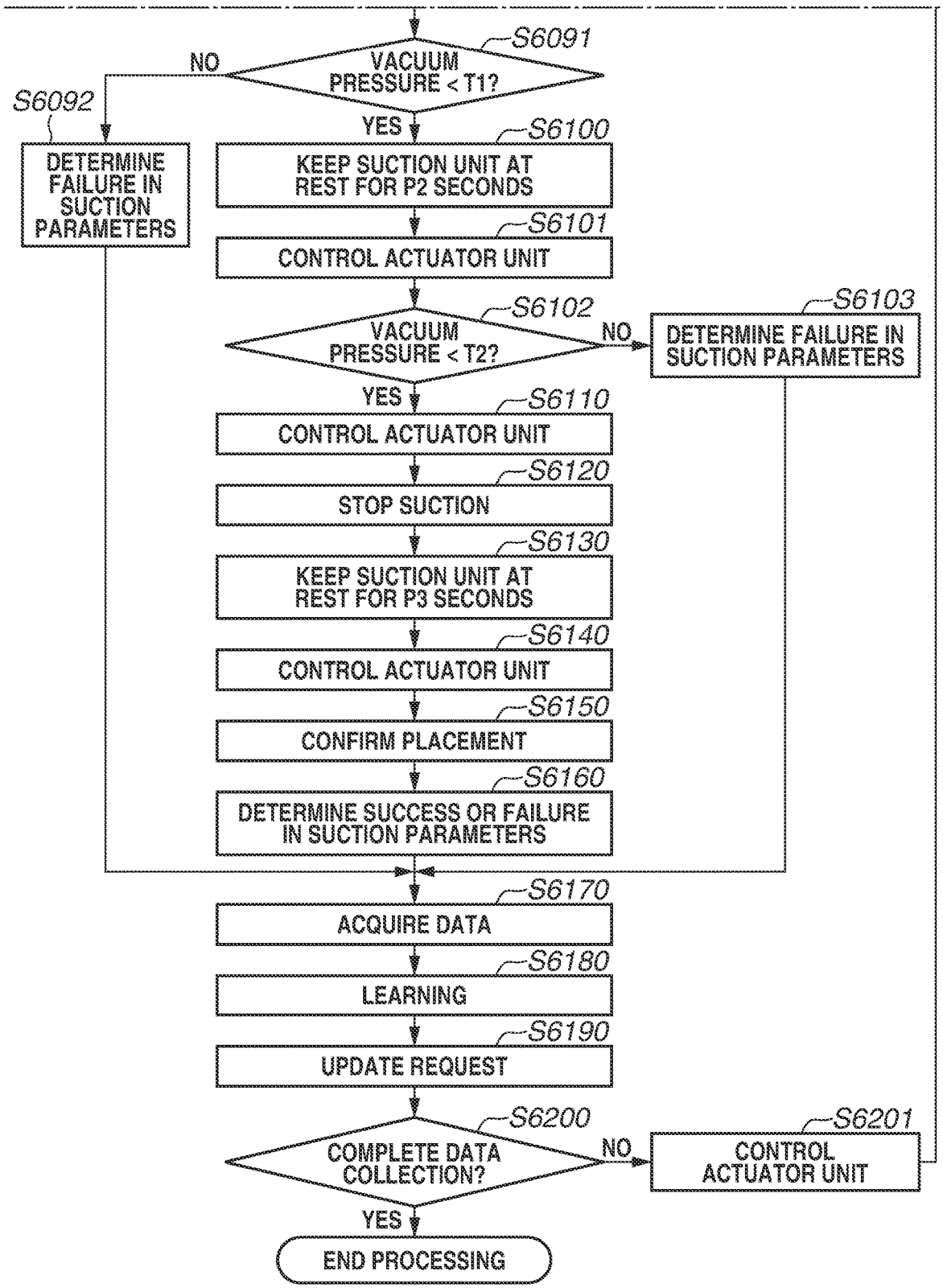
FIG. 6, which is composed of FIGS. 6A and 6B, is a flowchart illustrating a processing procedure which the information processing system performs according to the first exemplary embodiment.
Figure 16:
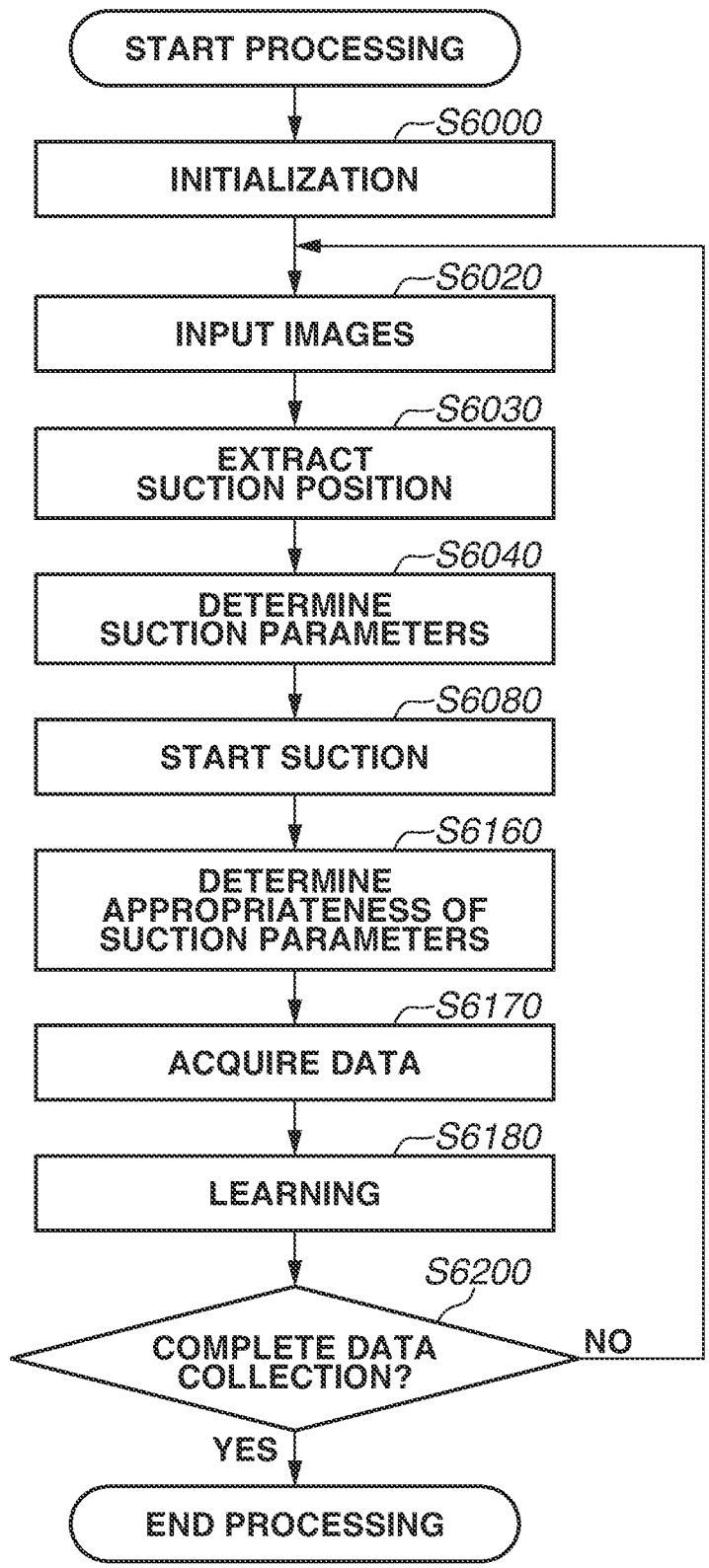
FIG. 16 is a flowchart illustrating a processing procedure which the information processing apparatus performs according to the first exemplary embodiment.

Next, a processing procedure in the learning mode in the first exemplary embodiment is described. First, an outline of processing which is performed in the learning mode is described. FIG. 16 is a flowchart illustrating a processing procedure which the information processing apparatus 1 performs. In step S6000, the information processing apparatus 1 performs initialization. In step S6020, the input unit 500 inputs an image captured by the imaging unit 10 to the extraction unit 501. In step S6030, the extraction unit 501 extracts a suction position for the packaged object 13 and a state of the surface of the packing material at the suction position from a surrounding image thereof based on the image input in step S6020. In step S6040, the determining unit 502 determines suction parameters from the state of the surface of the packing material at the suction position. In step S6080, the control unit 503 controls the actuator unit 11 or the suction unit 12 according to the suction parameters. In step S6160, the determination unit 506 determines whether the determined suction parameters have been appropriate based on the success or failure of suction and conveyance. In step S6170, the data acquisition unit 507 acquires data in which a result of determination of success or failure of suction is associated with a combination of the state of the surface of the packing material and the suction parameters. In step S6180, the learning unit 508 performs updating of the packing material suction feature database based on the collected data with use of the data acquired in step S6170. In step S6200, the information processing apparatus 1 determines whether to complete the task. If it is determined that the task has been completed (YES in step S6200), the processing ends, and, if it is determined that the task has not been completed (NO in step S6200), the processing returns to step S6020. Next, details of the processing are described. FIG. 6, which is composed of FIGS. 6A and 6B, is a flowchart illustrating a processing procedure which the information processing system 10000 including the information processing apparatus 1 in the first exemplary embodiment performs in the learning mode.

In step S6000, the information processing system 10000 performs initialization of the system. More specifically, the information processing apparatus 1 reads programs from the external memory H14, thus bringing the information processing apparatus 1 into the state of being able to operate. The information processing system 10000 performs start-up of the imaging unit 10 and the actuator unit 11, reading of parameters therefor, and reading of calibration information about the imaging unit 10, the actuator unit 11, and the suction unit 12, and uses internal parameters (for example, the focal length, image center position, and lens distortion) for the imaging unit 10, which have been calibrated in advance. Moreover, the information processing system 10000 reads positions of the container 14 and the container 15. Additionally, the information processing system 10000 reads a feature filter corresponding to the packing material suction feature database from the retention unit 505, applies the feature filter to a group of image patches in the packing material suction feature database, and previously obtains feature vectors corresponding to the image patches. Then, the information processing system 10000 classifies the feature vectors for every same or similar feature vector, refers to a result of determination of success or failure with respect to each feature vector, and associates a suction parameter which is likely to cause success with each feature vector. Moreover, before performing image capturing, the information processing system 10000 causes the actuator control unit 5031 to control the actuator unit 11 based on the calibrated position, thus moving the imaging unit 10 to such a position as to be able to capture an image of the packaged object 13 put in the container 14. In step S6001, to allow obtaining data about a result of determination of success or failure which is missing, the learning unit 508 generates a request by listing combinations of suction parameters in which results of determination of success or failure are to be acquired, thus updating the request in the retention unit 505. Then, the processing proceeds to step S6010. In step S6010, the imaging unit 10 captures an image of the packaged object 13 put in the container 14, thus obtaining a color image and a distance image. In step S6020, the input unit 500 inputs an image obtained by performing image capturing of the packaged object. More specifically, the input unit 500 inputs images captured by the imaging unit 10 to the extraction unit 501.

In step S6030, the extraction unit 501 extracts a suction position at which to cause the suction device to attract the packaged object by suction, by comparing a template, which is an image feature in which the state of the surface of the packaged object and the position adapted for suction are associated with each other, with the input images. Then, the processing proceeds to step S6040. Specific processing in step S6030 is similar to that described in step S4030. Moreover, in step S6030, to which the processing has returned from step S6041, the extraction unit 501 extracts a suction position which is different from the above extracted suction position. More specifically, in a case where there is no request in any of three suction parameters with respect to feature vectors corresponding to image patches obtained at the suction position, the extra n unit 501 excludes a suction position checking of which has already been determined to be unnecessary from among suction candidate areas. Then, the extraction unit 501 extracts a suction position from among the other suction candidate areas, and Outputs the extracted suction position to the determining unit 502.

In step S6040, the determining unit 502 determines timing concerning suction (suction parameters) according to the state of the surface of the packing material at the suction position. Specifically, the determining unit 502 obtains feature vectors by applying a feature filter corresponding to the packing material suction feature database input by the retention unit 505 to the image patches of the color image and the distance image at the suction position. The determining unit 502 acquires suction parameters corresponding to the feature vectors based on the request input by the retention unit 505. Here, the size of the image patch is set to 64 pixels in horizontal and vertical directions by resizing a square with a size into which the diameter of the suction pad fits in actual size. The determining unit 502 outputs the suction parameters acquired in this way to the suction control unit 5032. Then, the processing proceeds to step S6041. However, with regard to an element having no request out of the elements of the suction parameters, since a suction parameter element which is likely to cause success is already found, the determining unit 502 uses that element. Moreover, in a case where there is no request in any of the element of the suction parameters, the determining unit 502 determines that there is no request to be used, and the processing then proceeds to step S6041.

In step S6041, the determining unit 502 determines whether the suction parameters which have been included in the request output from the learning unit 508 are included in the suction parameters determined by the determining unit 502. If it is determined that the requested suction parameters are not included in the determined suction parameters (NO in step S6041), the processing returns to step S6030, in which the extraction unit 501 extracts a new suction position. If it is determined that at least one of the three suction parameters included in the request is present in the determined suction parameters (YES in step S6041), the processing proceeds to step S6050. In step S6050, the determining unit 502 determines a control parameter based on the suction parameters determined in step S6040, the initial position of the suction unit 12, and position information about the packaged object 13 and the container 15. The control parameter is a parameter used for the actuator unit 11 to perform movement control of the position of the suction unit 12. In step S6060, the actuator control unit 5031 controls the actuator unit 11 according to the control parameter determined in step S6050 in such a manner that the suction unit 12 arrives at the vicinity of the suction position input by the extraction unit 501.

In step S6070, the suction control unit 5032 performs determination by referring to the timing P1 for starting suction included in the suction parameters obtained in step S6040. If it is determined that suction is started in first (P1=0) (YES in step S6070), the processing proceeds to step S6080. On the other hand, if it is determined that suction is performed after contact with the packaged object (P1=1) (NO in step S6070), the processing proceeds to step S6071.

In step S6080, the suction control unit 5032 performs control to cause the suction unit 12 to start suction. In step S6090, the actuator control unit 5031 controls the actuator unit 11 according to the control parameter determined in step S6050 in such a way as to cause the suction unit 12 to come into contact with the packaged object 13 while suctioning the packaged object 13. Then, the processing proceeds to step S6091. In step S6071, the actuator control unit 5031 controls the actuator unit 11 according to the control parameter determined in step S6050 in such a way as to cause the suction unit 12 to come into contact with the packaged object 13. In step S6072, the suction control unit 5032 performs control to cause the suction unit 12 to start suction. At this time, the suction unit 12 is in the state of being in contact with the packaged object 13. Then, the processing proceeds to step S6091.

In step S6091, the determination unit 506 determines whether the vacuum pressure has decreased to lower than a threshold value T1. If it is determined that the vacuum pressure is lower than the threshold value T1 (YES in step S6091), since this means that suction is successful (a vacuum leak does not occur), the processing proceeds to step S6100. If it is determined that the vacuum pressure is higher than or equal to the threshold value T1 (NO in step S6091), since this means that suction is failed (a vacuum leak occurs), the processing proceeds to step S6092. Furthermore, the threshold value T1 is set based on the weight of the packaged object and the size of the suction pad in such a manner that the vacuum pressure becomes a force to execute lifting up the packaged object. In step S6092, the determination unit 506 determines failure in the timing for starting suction (P1) out of the set suction parameters. Since suction has not been able to be performed, the processing proceeds to step S6170 without, for example, conveyance being performed.

In step S6100, the actuator control unit 5031 keeps the suction unit 12 at rest for the first rest time (P2 seconds) while causing the suction unit 12 to contact and suction the packaged object 13 according to the first rest time (P2) included in the suction parameters determined in step S6040. When the suction unit 12 is kept at rest, for example, in a case where the surface of the packaged object has many wrinkles, causing the suction unit to perform suction while being in contact with the surface of the packaged object allows drawing in wrinkles and removing wrinkles, so that the packaged object can be sufficiently attracted by suction.

In step S6101, the actuator control unit 5031 controls the actuator unit 11 to slightly move the suction unit 12 upward. This is control which is performed to determine success or failure of the first rest time (P2 seconds). The amount of movement in this control only needs to be such a degree as to be able to confirm that the packaged object floats on air in a case where the packaged object has been attracted by suction by the suction unit 12. Then, the processing proceeds to step S6102.

In step S6102, the determination unit 506 determines whether the vacuum pressure has decreased to lower than a threshold value T2. If it is determined that the vacuum pressure is lower than the threshold value T2 (YES in step S6102), since this means that the packaged object 13 being attracted by suction and being retained is successful, the processing proceeds to step S6110. If it is determined that the vacuum pressure is higher than or equal to the threshold value T2 (NO in step S6102), since this means that the packaged object 13 being attracted by suction and being retained is failed, the processing proceeds to step S6103. Furthermore, with regard to the threshold value T2, the threshold value T1 is assumed to be greater than or equal to the threshold value T2.

In step S6103, the determination unit 506 determines failure in the first rest time (P2) out of the set suction parameters. Then, the processing proceeds to step S6170. In step S6110, the actuator control unit 5031 controls the actuator unit 11 to convey the packaged object 13 to the container 15 according to the control parameter determined in step S6050. In step S6120, to release the packaged object 13, which has been attracted by suction by the suction unit 12, to the container 15, the suction control unit 5032 performs control to stop suction performed by the suction unit 12.

In step S6130, the actuator control unit 5031 keeps the actuator unit 11 at rest for the second rest time (P3 seconds) since suction is stopped in step S6120 according to the second rest time (P3) included in the suction parameters. During that rest time, the packaged object 13 is completely released from the suction unit 12 to the container 15. For example, even in a case where the packing material is a somewhat hard material and is unlikely to be separated from the suction unit, keeping the actuator unit 11 for a while allows improving the success rate of releasing.

In step S6140, the actuator control unit 5031 controls the actuator unit 11 to move to a position available to confirm the placement of the packaged object. The position available for confirmation is a position available for the imaging unit 10 to capture an image of the conveyance destination. This position is acquired in advance in step S6000. In step S6150, the determination unit 506 determines whether the packaged object has been able to be placed to the conveyance destination. The method for determination includes causing the imaging unit 10 to capture an image of the conveyance destination and determining a result of position and orientation recognition of the packaged object indicating whether the packaged object has been placed to the conveyance destination at a desired or predetermined position or orientation. The position and orientation recognition includes estimating the position and orientation of the packaged object from the captured image and comparing the estimated position and orientation with the intended or a predetermined position and orientation. A sensor which is configured to determine the presence or absence of an object, such as a gravity sensor, can also be used. Then, the processing proceeds to step S6160.

In step S6160, with respect to the second rest time (P3) included in the set suction parameters, the determination unit 506 determines success in a case where, in the determination in step S6150, the result of position and orientation recognition is within the range of the desired or predetermined position and orientation. In a case where the result of position and orientation recognition is not within the range of the desired or predetermined position and orientation, the determination unit 506 determines failure. Moreover, the determination unit 506 determines success with respect to the timing for starting suction (P1) and the first rest time (P2). Then, the processing proceeds to step S6170. Furthermore, the range in which the target object is considered to have been able to be placed in an appropriate way is assumed to be a range in which the packaged object is placed when the suction unit 12 has been kept at rest for a sufficiently long time. Such a range can be empirically acquired by repeating similar processing several times.

In step S6170, the data acquisition unit 507 receives a result of determination of the suction parameters and image patches of the color image and the distance image, thus collecting those as data about packing material suction features. Then, the processing proceeds to step S6180. The result of determination of the suction parameters is any one of determination results obtained in steps S6092, S6103, and S6160. Specifically, the result of determination obtained via step S6092 imparts data indicating that the timing for starting suction results in failure and the other suction parameters result in the absence of data. The result of determination obtained via step S6103 imparts data indicating that the timing for starting suction results in success, the first rest time results in failure, and the second rest time results in the absence of data. The result of determination obtained via step S6160 imparts data indicating that the timing for starting suction results in success, the first rest time results in success, and the second rest time results in success or failure.

In step S6180, the learning unit 508 performs updating of the packing material suction feature database based on the collected data. Then, the processing proceeds to step S6190. Specifically, the learning unit 508 receives data about packing material suction features from the data acquisition unit 507, and obtains feature vectors from the image patches with respect to the received data. Then, the learning unit 508 adds success data and failure data about the obtained feature vectors to suction parametric spaces which are present for respective gatherings of feature vectors of the packing material suction feature database. Then, the learning unit 508 obtains a set of suction parameters having the highest success rate for each gathering of feature vectors. The set of suction parameters obtained in this way becomes provisional suction parameters which are extracted when switching to the execution mode has been performed. However, in a case where success data has not been able to be obtained even when data is exhaustively sampled with respect to a candidate for a request determined in advance, the learning unit 508 is assumed to discontinue learning. Alternatively, at the time when, even if success data has been obtained, it is confirmed that the probability of success data in the suction parameters thereof is significantly low (for example, when data is sampled in each parameter set N=10 times, success occurs only M=2 times), the learning unit 508 is assumed to discontinue learning. For example, with regard to feature vectors indicating the state in which there is a hole on the surface of the packaged object, there is a high possibility of suction being failed even if any suction parameter is changed. With regard to such feature vectors for which appropriate suction parameters are not found, processing is assumed to be performed in such a manner that, in the case of the learning mode, learning is discontinued and, in the case of the execution mode, the suction position is changed. In the above-described way, the packing material suction feature database is updated. With the updated database in use, when image patches are input, more appropriate suction parameters can be output via feature vectors.

In step S6190, the learning unit 508 updates the request with use of the updated packing material suction feature database. Then, updating of the request is performed in the retention unit 505. Then, the processing proceeds to step S6200. If, in step S6200, it is determined that the information processing apparatus 1 completes data collection at this time (YES in step S6200), the processing ends. If it is determined that the information processing apparatus 1 still continues data collection (NO in step S6200), the processing proceeds to step S6201. The condition for completing data collection includes a case where the total number of requests which the learning unit 508 has generated for the respective gatherings of feature vectors has become less than or equal to a threshold value. However, the condition for completion is not limited to this, but can include, for example, a case where the number of pieces of data as collected has become greater than or equal to a threshold value and a case where the amount of time spent to collect data has become greater than or equal to a threshold value. In step S6201, the actuator control unit 5031 controls the actuator unit 11 in such a way as to move the imaging unit 10 to an image capturing position for performing image capturing of a next packaged object. Then, the processing returns to step S6010, in which image capturing is re-performed so as to allow suction and conveyance of the next packaged object. As described above, in the case of the learning mode, the packing material suction feature database is obtained by learning in the learning mode of the information processing system. This allows providing an information processing system which performs suction and conveyance by obtaining suction parameters most appropriate for suction even with respect to a packaged object packed with a new packing material.

While, in the first exemplary embodiment, it has been described that the actuator unit 11 and the container 14 are fixed in place, the first exemplary embodiment is not limited to this. For example, the actuator unit 11 or the container 14 can be mounted on a moving apparatus, such as an automatic guided vehicle (AGV), to perform suction and conveyance. With this, mounting the actuator unit 11 on the moving apparatus allows performing conveyance even if the container 15 is situated at a distant location. Moreover, mounting the container 14 on the moving apparatus allows taking out and collecting various types of packaged objects put in various containers stored in, for example, a warehouse.

While, in the first exemplary embodiment, an example in which the imaging unit 10 is a camera configuration attached to the actuator unit 11 has been described, the first exemplary embodiment is not limited to this. For example, the imaging unit 10 can be a fixed camera configuration attached at such a position as to allow measuring the container 14 and the packaged object 13 put therein. In that case, the bases of the imaging unit 10 and the actuator unit 11 are assumed to be previously calibrated. Using a camera fixed in place allows more stably obtaining the position of a packaged object.

The information processing apparatus 1 can further include a display unit such as a display. For example, the display unit can display, for example, a captured image, a distance image, a suction candidate area, a suction position, and values of suction parameters. Moreover, the display unit can display a next operation process of the robot. This allows the user to know a process of processing operations or the internal state of the system.

While, in the first exemplary embodiment, it has been described that the packing material suction feature is used to set a relationship between image patches of the color image or the distance image and suction parameters, such inputs are not limited to image patches. For example, information about a packaged object, such as the type of a packing material such as plastic (vinyl) or nylon or the weight of a packaged object can be input. For example, in a case where the type of a packing material is manually input, the name of the material is entered as, for example, "vinyl" or "polyethylene" via a keyboard. The information processing apparatus 1 acquires and utilizes such an input result. This allows adding an input other than the physical appearance and thus more effectively obtaining suction parameters.

While, in the first exemplary embodiment, it has been described that feature filters in the packing material suction feature database are previously-prepared filters, the first exemplary embodiment is not limited to this. For example, in the learning mode in the first exemplary embodiment, in a case where a large amount of packing material suction feature data has been able to be collected, appropriate feature filters can be redesigned from a database containing such a large amount of data. In this case, since feature filters are learned from a large amount of data with use of a learning technique such as deep learning, there is no need to manually prepare feature filters. Specifically, with respect to suction parameters and success data or failure data corresponding to image patches, an image patch group can be subjected to filter conversion to be made into a gathering of feature vectors for every same or similar suction parameters. At this time, such filter conversion as to make it easy for success data and failure data to be separated into different gatherings of feature vectors can be set as feature filters. Obtaining feature filters in this way allows selecting more appropriate suction parameters.

While, in the learning mode in the first exemplary embodiment, an example in which three respective elements of the suction parameters are able to be independently determined has been described, the first exemplary embodiment is not limited to this. For example, in FIG. 6, at the conditional branching in step S6091, the processing proceeds to step S6100 and, at the conditional branching in step S6102, the processing proceeds to step S6110. The processing is assumed to proceed irrespective of the value of the vacuum pressure, which is a condition for branching in those steps, and, in step S6150, a determination is performed only once as to whether an operation leading to placement has been appropriately or correctly performed, so that one determination result can be returned with respect to one set of three suction parameters. In this way, even in a case where there is a cause-and-effect relationship between elements of the suction parameters, a database to be used to appropriately estimate suction parameters can be established.

While, in the learning mode in the first exemplary embodiment, an example in which, while data is being successively collected, learning and updating are performed has been described, the first exemplary embodiment is not limited to this. For example, after a predetermined amount of data is collected, learning and updating can be performed at one time.

While, in the learning mode in the first exemplary embodiment, an example in which learning for obtaining suction parameters is performed from the number or distribution of pieces of success data and failure data has been described, the first exemplary embodiment is not limited to this. A method other than the method of performing learning (enabling obtaining suction parameters) by updating a database, in other words, increasing sample data (about, for example, success data or failure data) can be employed. For example, a reward unit can be further included, and learning can be performed within the framework of reinforcement learning. For example, the learning unit 508 generates, as a request, one set of suction parameters every time and outputs the set of suction parameters to the determining unit 502 via the retention unit 505. In a case where the determination unit 506 has determined success with respect to the suction parameters, the reward unit is assumed to gain a plus reward, and, in a case where the determination unit 506 has determined failure with respect to the suction parameters, the reward unit is assumed to gain a minus reward. To allow gaining a plus reward whenever possible, the learning unit 508 learns a network of such deep learning as to output suction parameters appropriate for the input image patches, within the framework of reinforcement learning. Performing such learning reduces to eliminates the necessity of defining designing of feature filters or the method of obtaining suction parameters. Moreover, the packing material suction feature database only needs to store, as data, only image patches, suction parameters, and success, failure, or reward regarding those. In this way, the trouble of designing feature filters or the trouble of obtaining a request within the database every time can be reduced. Moreover, the learning unit 508 is able to performing even with supervised learning. For example, the learning unit 508 receives, as an input, an image (at least one of the color image and the distance image) representing the shape of the surface of a packing material, and learns connection weights of a trained model (neural network) which outputs control information including suction timing. With respect to a combination of an image obtained by performing image capturing of the surface of a packing material and control information, which are an input and an output, the learning unit 508 performs learning by imparting, as teacher data, a label of correct answer or incorrect answer to a result indicating whether suction is successful.

While, in the learning mode in the first exemplary embodiment, an example in which the values of requests are acquired with respect to respective three suction parameters, suction and conveyance are performed, and learning is performed by collecting data from results of determination about those operations have been described, the first exemplary embodiment is not limited to this. For example, with respect to the first rest time and the second rest time included in the suction parameters, the acquisition of suction parameters responsive to the request can be omitted. An appropriate first rest time and an appropriate second rest time can be directly acquired by observing the value of the vacuum pressure in real time and measuring a time required until the observed value exceeds a threshold value or falls below a threshold value. Since acquiring data in this way allows reducing failure data, data can be efficiently acquired.

While, in the learning mode in the first exemplary embodiment, it has been described that, only if at least one set of three suction parameters having a high success rate is found with respect to a gathering of feature vectors, no request is needed, the first exemplary embodiment is not limited to this. For example, to allow finding out a combination of suction parameters having a higher success rate, a further request can be sent.

While, in step S4030 illustrated in FIG. 4, it has been described that the extraction unit 201 extracts a suction candidate position from an area which is present on the near side among a plurality of packaged objects 13 stacked in piles and which does not interfere with another packaged object, the first exemplary embodiment is not limited to this. For example, normal lines to the respective pixels are obtained from the distance image, and, as a larger number of normal lines face a surface likely to be attracted by suction (a direction in which the opening of the container 14 faces), the packaged object can be determined to be more suited for a suction candidate. Alternatively, to prevent the occurrence of interference or friction with the container 14, as a packaged object is located farther from the side surface of the container 14, the packaged object can be determined to be more suited for a suction candidate. Moreover, information about the position or size of the container 14 can be used to detect a candidate for a packaged object 13 which is easy to take out. With respect to a packaged object located at a position near the inner side edge of the container 14, there is the possibility that the suction unit 12 collides with the edge of the container 14. Specifically, information indicating that suction is possible in a case where the distance between the edge of the container 14 and the packaged object is greater than the size of the suction unit 12 (or the suction pad) or the size of the packaged object is reflected in a suction candidate area. Also taking the position of the container 14 into consideration allows stably performing suction. Moreover, elements such as a packaged object being present on the near side and not interfering, the normal lines facing an appropriate surface, and a packaged object being farther from the container 14 can be quantified, and, as the obtained numerical values are higher, the packaged object can be determined to be more suited for a suction candidate area, so that a weighting linear sum of those can be used to obtain a suction candidate area.

Moreover, while, in step S4030 illustrated in FIG. 4, an example in which, to acquire a suction position, the extraction unit 201 identifies the position of a packaged object by template matching and thus obtains a suction candidate area has been described, the first exemplary embodiment is not limited to this. For example, the extraction unit 201 can use a convolutional neural network (CNN) model, which receives a color image or a distance image as an input and outputs the position or orientation of the packaged object 13. In that case, the extraction unit 201 can prepare a great number of correspondence data sets between the color image or distance image and the position or orientation of the packaged object 13 and then previously perform learning. Specifically, the extraction unit 201 uses a trained model obtained by performing learning with use of a learning image with a correct answer label attached thereto defining the position of the center of mass of the packaged object as a suction position, and thus estimates the suction position from the image. Alternatively, the extraction unit 201 can acquire a suction position previously designated by the user based on the position of the packaged object. The same also applies to the extraction unit 501 in step S6030 illustrated in FIG. 6.

While, in step S4040 illustrated in FIG. 4, an example in which the determining unit 202 obtains suction parameters from patches of the color image and the distance image obtained at the suction position and its surrounding portion has been described, the first exemplary embodiment is not limited to this. For example, the extraction unit 501 can acquire the weight of the packaged object 13 and the determining unit 502 can determine suction parameters based on patches of the color image and the distance image and the weight of the packaged object 13. In that case, the packing material suction feature database is also configured as a database further including the axis of the weight of a packaged object. Alternatively, processing using the packing material suction feature database is performed just as in step S4040. As additional post-processing, processing for converting the values of suction parameters according to the weight of a packaged object can be performed in such a manner that, as the packaged object is heavier, the first rest time is set longer and the second rest time is set shorter. The same also applies to the determining unit 502 in step S6040 illustrated in FIG. 6.

While, in step S6100 illustrated in FIG. 6, an example in which the suction unit is kept at rest for the first rest time (P2) has been described, the first exemplary embodiment is not limited to this. For example, the vacuum voltage can be observed in real time while the suction unit is in contact with the packaged object and is suctioning the packaged object, and, when the vacuum voltage has decreased to a threshold value or less, keeping the suction unit at rest can be stopped. Similarly, while, in step S6130, an example in which the suction unit is kept at rest for the second rest time (P3) has been described, the first exemplary embodiment is not limited to this. For example, when it has been detected that the packaged object 13 has been separated from the suction unit 12 with use of a video camera which can execute observing the suction unit 12 and the packaged object 13 at the time of release into the container 15, keeping the suction unit 12 at rest can be stopped. This allows decreasing the number of suction parameters and, therefore, facilitates learning of suction parameters in the learning mode. Moreover, the size of the packing material suction feature database can be reduced.

While, in step S6150 illustrated in FIG. 6, an example in which whether the packaged object has been appropriately placed is confirmed by performing image capturing has been described, the first exemplary embodiment is not limited to this. For example, in the case of a task in which the conveyance destination is a container such as a box and a packaged object only needs to be put in the inside of the box, measuring the weight of the inside of the box allows determining whether the packaged object has been placed. This allows saving the trouble of performing image capturing for confirmation or recognizing the packaged object. Moreover, in that case, since it is not necessary to move the actuator unit 11 to the confirmation position in step S6140, the actuator unit 11 can be immediately moved to a next image capturing position as in step S6201, so that a cycle time can be shortened.

Figure 1B:
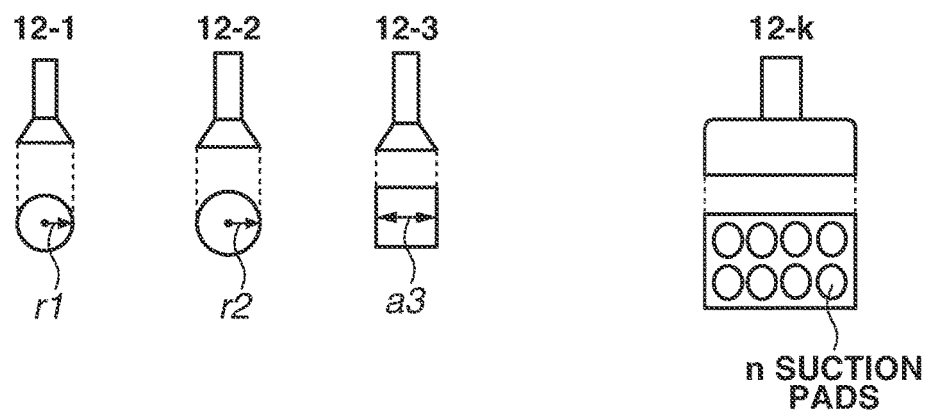

In the above-described first exemplary embodiment, an example in which an information processing system using a given specific suction unit is used to perform a task of suction and conveyance or perform learning has been described. On the other hand, in a second exemplary embodiment, with regard to a case where an information processing system further includes a suction switching unit and performs suction and conveyance while switching suction units, respective examples of the execution mode and the learning mode are described. In the second exemplary embodiment, as illustrated in FIG. 1B, the information processing system includes a plurality of suction units different in size and material. The second exemplary embodiment can also be applied to a case where there is a suction unit composed of a plurality of suction pads integrated together and switching to that suction unit can be performed. For example, in the case of handling a small target object or an object having few flat surfaces available for suction, unless a suction pad having a small contact surface of the suction unit is used, air may leak, so that suction cannot be performed. Therefore, switching to a suction unit small in diameter is performed. Moreover, in the case of attracting a large and heavy object by suction, a suction unit in which the flow rate of air to be suctioned is large is used, or a suction unit composed of a plurality of suction pads integrated together is used to increase supporting points or increase a suction area, so that the object can be stably conveyed. Thus, selecting an appropriate suction unit according to a packaged object which is a target for suction allows stably attracting, by suction, and conveying a packaged object, which is an object packed with a packing material.

In conjunction with handling of a plurality of types of suction units, information about suction units is added to the packing material suction features. In other words, the packing material suction features become data in which image patches, suction parameters, suction unit information, and results of determination of success or failure of suction and conveyance are associated with each other. A specific example is described with reference to FIG. 19, in which a suction unit 12-1 includes a suction pad with a radius of r1. Similarly, a suction unit 12-2 includes a suction pad with a radius of r2, and a suction unit 12-3 includes a suction pad having a square shape with a side of a3. A configuration including n suction pads can be employed as a suction unit 12-$k$. Moreover, the packing material suction feature database is a database in which packing material suction features with such suction unit information added thereto are gathered. The configuration of the information processing system 10000 in the second exemplary embodiment includes, in addition to the configuration in the first exemplary embodiment illustrated in FIG. 1A, k types of suction units such as those illustrated in FIG. 1B as the suction unit 12.

Figure 7:
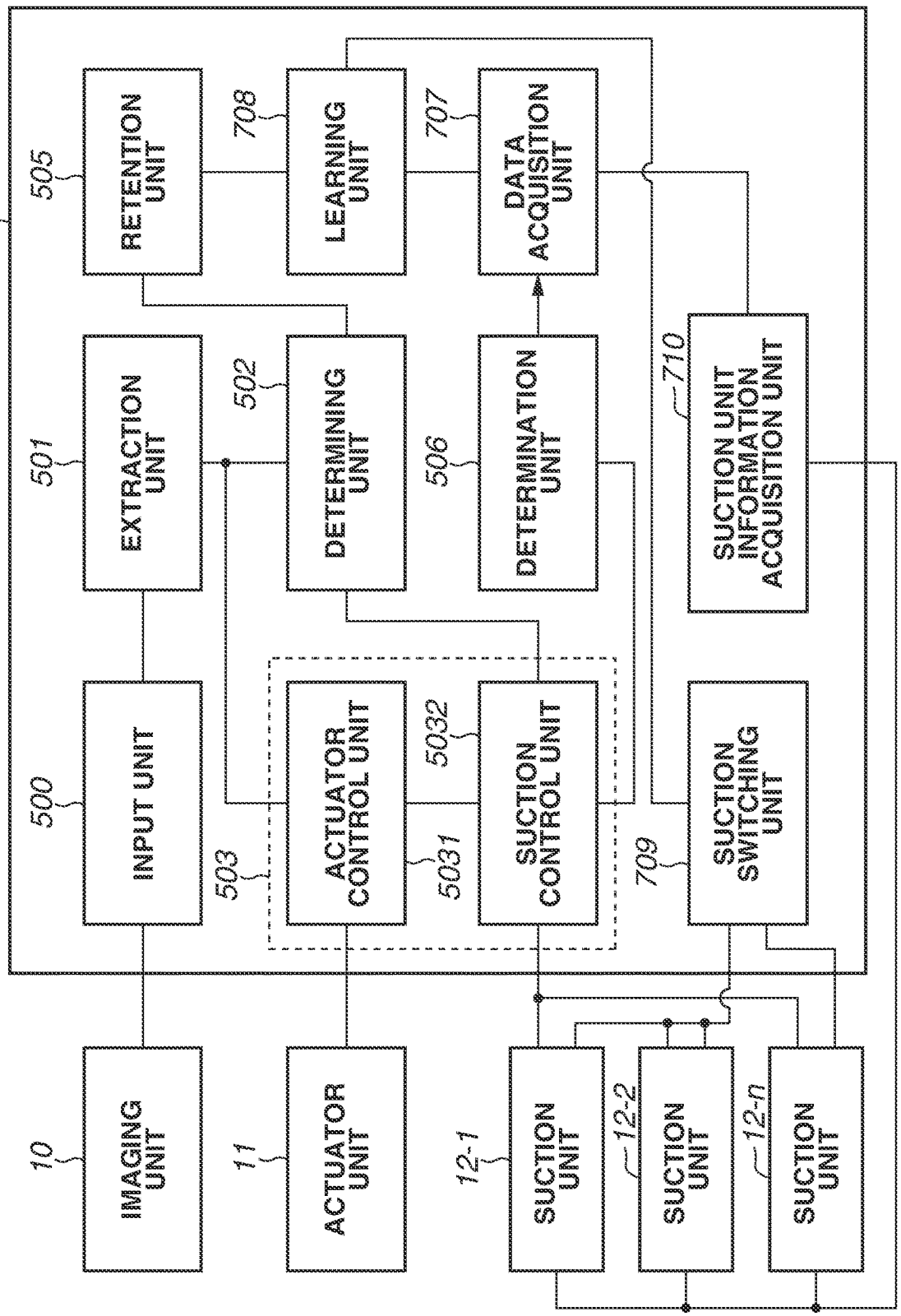
FIG. 7 is a diagram illustrating a functional configuration example of an information processing apparatus according to a second exemplary embodiment, FIG. 8, which is composed of FIGS. 8A and 8B, is a flowchart illustrating a processing procedure which an information processing system performs according to the second exemplary embodiment.

FIG. 7 is a diagram illustrating an apparatus configuration example of the information processing apparatus 1 in a case where, from among the learning mode and the execution mode, the learning mode has been selected by a mode switching unit (not illustrated) in the second exemplary embodiment. The information processing apparatus 1 illustrated in FIG. 7 includes an input unit 500, an extraction unit 501, a determining unit 502, an actuator control unit 5031, a suction control unit 5032, a retention unit 505, a determination unit 506, a data acquisition unit 707, a learning unit 708, a suction switching unit 709, and a suction unit information acquisition unit 710. Moreover, the information processing apparatus 1 illustrated in FIG. 7 is connected to the imaging unit 10 and the actuator unit 11. Additionally, the information processing apparatus 1 illustrated in FIG. 7 is connected to n suction units 12-1, 12-2, . . . , 12-$n$. These suction units 12-1 to 12-$n$ respectively include suction pads which are different from each other in material and size. The configuration of the information processing apparatus 1 in the learning mode in the second exemplary embodiment is approximately similar to that illustrated in FIG. 5 in the first exemplary embodiment (learning mode). Similar functions are omitted from description, and different functions, i.e., the suction unit information acquisition unit 710, the data acquisition unit 707, the suction switching unit 709, and the learning unit 708 are described.

The suction unit information acquisition unit 710 acquires information about a suction unit (suction unit information) from the suction unit 12-1, and then outputs the suction unit information to the data acquisition unit 707. Here, the information about a suction unit is shape information indicating, for example, the size and diameter of a suction pad and the presence or absence of folds thereof and information about the material of the suction pad.

The data acquisition unit 707 collects teacher data for performing learning, based on a result of determination input by the determination unit 506 and the suction unit information input by the suction unit information acquisition unit 710. The data acquisition unit 707 outputs the collected teacher data group to the learning unit 708.

In response to receiving, from the learning unit 708, an instruction to switch the suction unit 12-1, the suction switching unit 709 performs switching of the suction unit 12-1. In a case where there is a plurality of switching candidates, a candidate to which switching is to be performed is written in the instruction sent from the learning unit 708. With regard to the method of switching the suction unit 12-1, the suction unit 12-1 and the fore-end of the actuator unit 11 are configured to be coupled to each other by an auto hand changer. The actuator control unit 5031 controls the actuator unit 11 to perform an operation to detach the current suction unit and attach a new suction unit. However, the switching method is not limited to this, but, in a case where a plurality of suction units 12-1 is incorporated in the actuator unit 11, such suction units can be switched. Moreover, a display for prompting the user to perform switching can be displayed on a display unit (not illustrated) and the user can be allowed to perform switching.

The learning unit 708 performs learning based on the teacher data group input by the data acquisition unit 707. The learning unit 708 updates the packing material suction feature database including the information about suction units, and, when receiving image patches and information about suction units, performs an operation to execute outputting appropriate suction parameters. The learning unit 708 outputs the trained contents to the retention unit 505. Moreover, the learning unit 708 generates a request for data required to improve the database, and outputs the request to the retention unit 505. The request is generated so as to also collect data about suction units as illustrated in FIG. 19B. Additionally, in a case where it is necessary to switch between suction units so as to improve the database, the learning unit 708 sends, to the suction switching unit 709, an instruction indicating a suction unit to which switching is to be performed. Here, an image patch in the second exemplary embodiment is a patch obtained by resizing, into a predetermined pixel size, a square area within which the maximum pad diameter of a suction unit switchable in actual size falls.

Figure 8B:
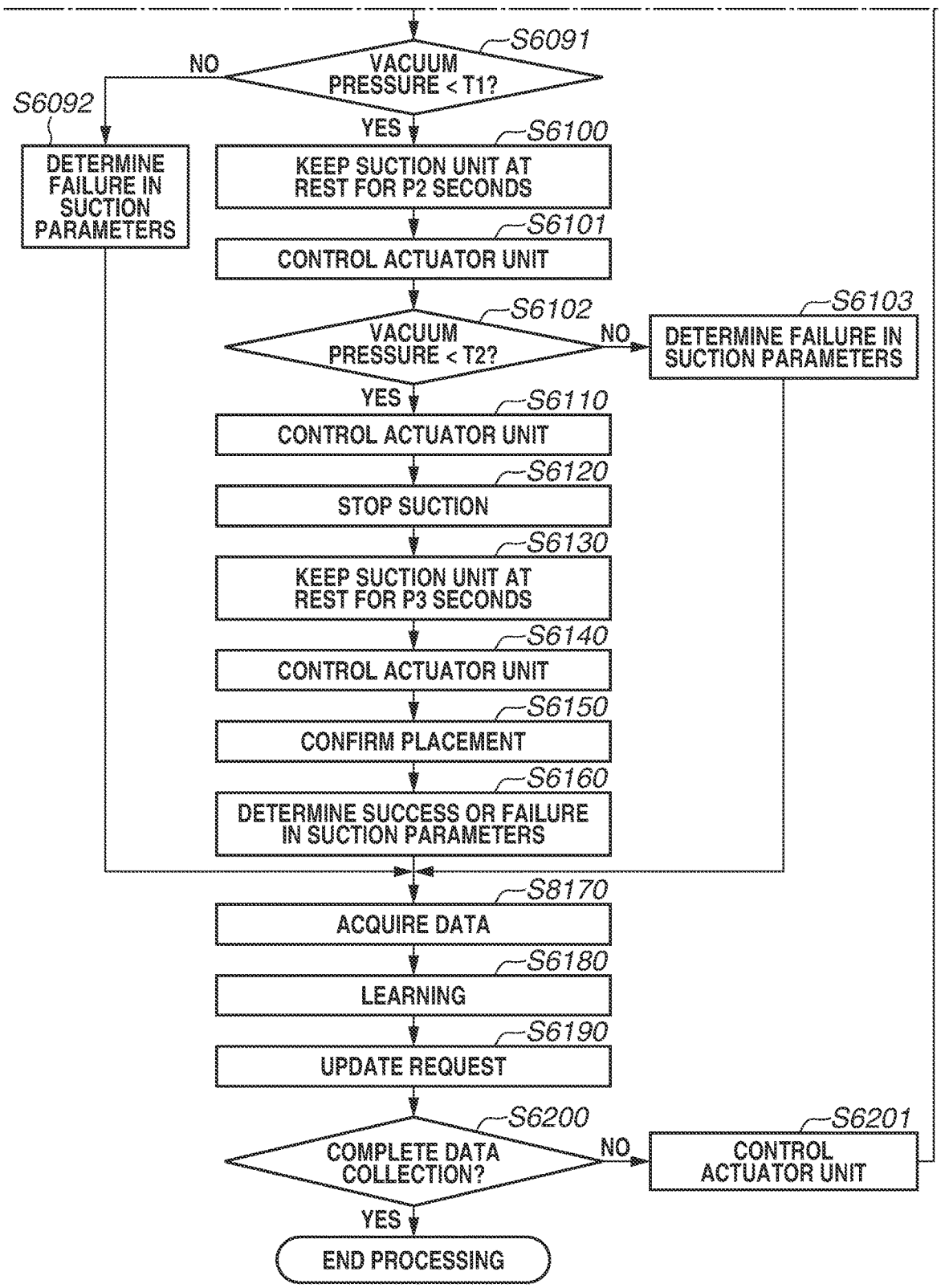

Next, a processing procedure in the learning mode in the second exemplary embodiment is described. FIG. 8, which is composed of FIGS. 8A and 8B, is a flowchart illustrating a processing procedure which the information processing system 10000 including the information processing apparatus 1 in the second exemplary embodiment performs in the learning mode. Processing operations similar to those in the flowchart of FIG. 6 in the first exemplary embodiment are described in a simplified manner. In step S8000, the information processing system 10000 performs initialization of the system as with step S6000 in the first exemplary embodiment. In addition to processing in step S6000, the suction unit information acquisition unit 710 previously acquires suction unit information about the current suction unit 12-1 (for example, the size r1 of the diameter of the suction pad thereof). Then, the processing proceeds to step S8001.

In step S8001, the learning unit 708 generates a request, thus updating the request in the retention unit 505. Then, the processing proceeds to step S6010. While the method of generating a request is approximately similar to that described in the learning mode in the first exemplary embodiment, suction unit information is previously added to the packing material suction features. As a result, in a suction parameter space, a new dimension concerning suction unit information is added. FIG. 19B illustrates an example of a request including suction unit information. Therefore, the request can be generated by mapping results of determination of success or failure corresponding to suction parameters onto the suction parameter space for every gathering of feature vectors and further for each piece of suction unit information and by also including the dimension concerning suction unit information. For example, the suction unit 12-1 is assumed to include a suction pad with a small diameter (r1) and the suction unit 12-2 is assumed to include a suction pad with a large diameter (r2; r1<r2). Moreover, the learning unit 708 checks whether there is a request concerning a switchable suction unit for every gathering of feature vectors and generates an instruction to perform switching to a suction unit about which data collection is required. Specifically, the learning unit 708 compares the current suction unit with a switchable suction unit, and, if there is a suction unit about which data collection is to be prioritized over the current suction unit, the learning unit 708 generates an instruction to perform switching to that suction unit. The condition for determining that data collection is to be prioritized includes, for example, a case where, when the success rates of the respective suction units are compared with each other, the success rate of the current suction unit exceeds that of the other suction unit by a threshold value or more. However, the condition is not limited to this. In step S6010, the imaging unit 10 captures an image of the packaged object. In step S6020, the input unit 500 inputs the image captured by the imaging unit 10.

In step S6030, the extraction unit 501 extracts a suction position for the packaged object 13 and a state of the surface of the packing material at the suction position from a surrounding image thereof based on the image input in step S6020. In step S6040, the determining unit 502 determines suction parameters according to a request. In step S6041, the determining unit 502 determines whether a request sent from the learning unit 708 is present. If it is determined that the request is not present (NO in step S6041), the processing returns to step S6030. If it is determined that the request is present (YES in step S6041), the processing proceeds to step S6050. In step S6050, the determining unit 502 determines suction parameters. In step S8051, the learning unit 708 determines whether switching of the suction unit 12-1 is required according to the output request. If it is determined that switching of the suction unit 12-1 is required (YES in step S8051), the processing proceeds to step S8052. If it is determined that switching of the suction unit 12-1 is not required (NO in step S8051), the processing proceeds to step S6060. In step S8052, the suction switching unit 709 performs switching of the suction unit 12-1, and the processing then proceeds to step S8053. In step S8053, the suction unit information acquisition unit 710 acquires information about the suction unit 12-2 to which switching has been performed. Then, the processing proceeds to step S6060. Processing operations in steps S6060 to S6160 are similar to those in the first exemplary embodiment, and are, therefore, omitted from description here. In step S8170, the data acquisition unit 707 receives results of determination of suction parameters, suction unit information, and image patches of the color image and the distance image, thus acquiring data about packing material suction features. Then, the processing proceeds to step S6180. Processing operations in step S6180 and subsequent steps are similar to those in the first exemplary embodiment, and are, therefore, also omitted from description here. With the above-described processing, the information processing system 10000 is able to learn the packing material suction feature database by collecting teacher data while switching between suction units in the learning mode.

Next, the execution mode is described. FIG. 9 is a diagram illustrating an apparatus configuration example of the information processing apparatus 1 in a case where, from among the learning mode and the execution mode, the execution mode has been selected by a mode switching unit (not illustrated) in the second exemplary embodiment. The configuration of the information processing apparatus 1 in the execution mode in the second exemplary embodiment is approximately similar that illustrated in FIG. 2 in the first exemplary embodiment. The information processing apparatus 1 illustrated in FIG. 9 further includes a suction unit information acquisition unit 910 and a suction switching unit 909 in addition to an input unit 200, an extraction unit 201, a determining unit 902, an actuator control unit 2031, a suction control unit 2032, and a retention unit 205. Additionally, the information processing apparatus 1 illustrated in FIG. 9 is connected to the imaging unit 10, the actuator unit 11, and a plurality of suction units 12-1, 12-2, and 12-1. Similar functions are omitted from description, and different functions, i.e., the suction unit information acquisition unit 910, the determining unit 902, and the suction switching unit 909 are described.

The suction unit information acquisition unit 910 acquires information about a suction unit from the suction unit 12, and then outputs the information about a suction unit to the determining unit 902. The information about a suction unit is, for example, shape information indicating, for example, the size and diameter of a suction pad and the presence of absence of folds thereof and information about the material of the suction pad in each of a plurality of switchable suction units. The determining unit 902 extracts suction parameters based on the packing material suction feature database retained by the retention unit 205 and the suction unit information input by the suction unit information acquisition unit 910 in an image region corresponding to the suction position input by the extraction unit 201. Moreover, the determining unit 902 obtains information about an optimum suction unit out of the switchable suction units. Specific processing thereof is described below. The determining unit 902 outputs the extracted suction parameters to the control unit 203. Moreover, the determining unit 902 outputs the information about an optimum suction unit to the suction switching unit 909. The suction switching unit 909 performs switching from the suction unit 12 to a designated suction unit, if the need arises, based on the information about an optimum suction unit input by the determining unit 902.

Figure 10:
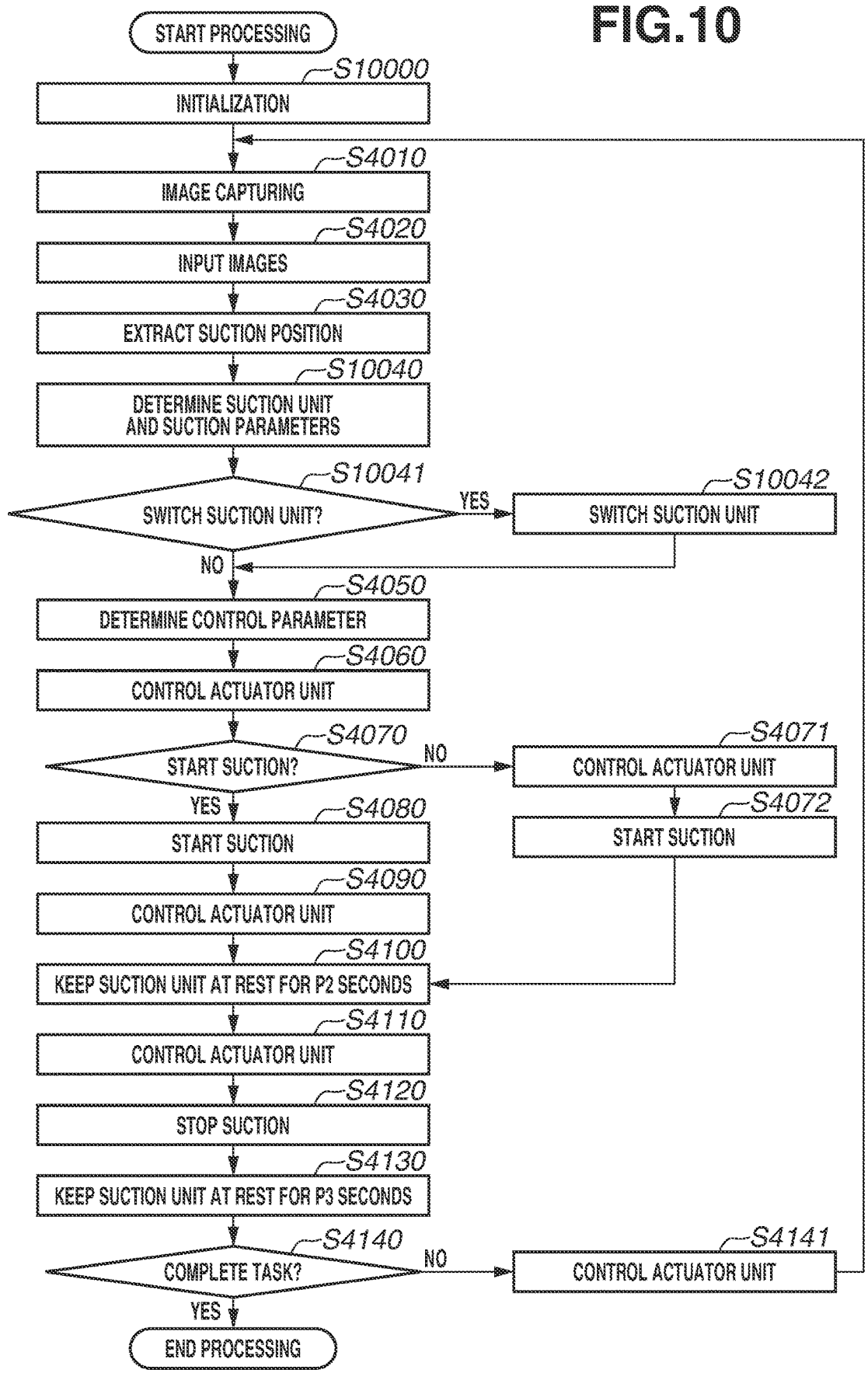
FIG. 10 is a flowchart illustrating a processing procedure which the information processing system performs according to the second exemplary embodiment.

Next, a processing procedure in the execution mode in the second exemplary embodiment is described. FIG. 10 is a flowchart illustrating a processing procedure which the information processing system 10000 including the information processing apparatus 1 in the second exemplary embodiment performs in the task execution mode. The flowchart of FIG. 10 in the second exemplary embodiment is approximately similar to the flowchart of FIG. 4 in the first exemplary embodiment. The outline of processing in FIG. 10 is described. In step S10000, the information processing system 10000 performs initialization of the system as with step S4000 in the first exemplary embodiment. In addition to processing in step S4000, the suction unit information acquisition unit 910 previously acquires information about switchable suction units. In step S4010, the imaging unit 10 captures an image of the packaged object 13, which is to be conveyed. In step S4020, the input unit 200 inputs the image captured by the imaging unit 10. In step S4030, the extraction unit 201 extracts the suction position for the packaged object 13 from the input image. In step S10040, the determining unit 902 determines an optimum suction unit and suction parameters in the suction position acquired in step S4030 with use of the color image, the distance image, and the packing material suction feature database. Specifically, the determining unit 902 first extracts patches of the color image and distance image at the suction position and its surrounding portion and obtains feature vectors by applying feature filters to the image patches. Then, the determining unit 902 performs matching of feature vectors in the packing material suction feature database. If similar feature vectors are found, the determining unit 902 is able to extract suction parameters which are likely to cause success and are associated with the found feature vectors, for each switchable suction unit. Then, the determining unit 902 calculates a score that is based on the success rate and a cost of switching for each switchable suction unit, and selects a suction unit in which the score is the largest and the suction parameters. With regard to the method of calculating the score, when the success rate obtained in selecting optimum suction parameters for a suction unit I is denoted by S_I and a cost of switching to the suction unit I is denoted by C_I, a score Score_I in a case where switching to the suction unit I has been performed is obtained by the following formula (1):

$$\text{Score\_I} = g(S\_I) - C\_I \quad (1)$$

In formula (1), g(X) is a monotonically increasing function for converting the success rate X to a score, and C_I is a switching cost with a positive value, the larger value thereof indicating a larger switching cost. Moreover, in a case where the suction unit I is the same as the current suction unit, since switching is unnecessary, "C_I=0" is set. In a case where the suction unit I is different from the current suction unit, switching between suction units is to be performed. In this regard, argmax (Score_I) can be calculated. In this way, the determining unit 902 obtains a suction unit I to which switching is to be performed and optimum suction parameters for use at that time.

In step S10041, the determining unit 902 determines whether the suction unit I obtained in step S10040 is different from the current suction unit, and, if it is determined that the current suction unit and the suction unit I are different from each other (YES in step S10041), the processing proceeds to step S10042 so as to perform switching between suction units. If it is determined that the current suction unit and the suction unit I are the same (NO in step S10041), the processing proceeds to step S4050. In step S10042, the suction switching unit 909 performs switching from the suction unit 12-1 to the suction unit I. Then, the processing proceeds to step S4050. Processing operations in step S4050 and subsequent steps are similar to those in the first exemplary embodiment, and are, therefore, omitted from description here. With the above-described processing, the information processing system 10000 is able to perform suction with a higher suction success rate while switching the suction unit 12 in the execution mode.

As described above, in the second exemplary embodiment, in each of the learning mode and the execution mode of the information processing system, switching between suction units allows more increasing the suction success rate to perform suction and conveyance of a packaged object packed with a packing material. Moreover, switching between suction units allows performing learning including suction unit information for more increasing the suction success rate.

While, in the second exemplary embodiment, it has been described that each of the suction unit information acquisition units 710 and 910 acquires, from the suction unit 12-1, information about the suction unit 12-1, the second exemplary embodiment is not limited to this. For example, information about switchable suction units can be retained in each of the retention units 205 and 505, and the suction unit information acquisition units 710 and 910 can acquire the information from the retention units 205 and 505, respectively.

Moreover, while, in the second exemplary embodiment, it has been described that each of the suction unit information acquisition units 710 and 910 acquires, as information about a suction unit, shape information indicating, for example, the size and diameter of a suction pad and the presence of absence of folds thereof and information about the material of the suction pad, the second exemplary embodiment is not limited to this. For example, each of the suction unit information acquisition units 710 and 910 can be configured to acquire the model number or identifier (ID) of a suction pad, thus being able to discriminate respective suction pads. This not only reduces the trouble of registering information about a suction pad but also allows taking measures against switching of suction pads.

While, in the second exemplary embodiment, it has been described that the learning unit 708 determines whether to perform switching between suction units in step S8051 illustrated in FIG. 8, the timing for switching between suction units is not limited to this. For example, immediately before the imaging unit 10 is moved to an image capturing position in step S6201, a determination as to whether to switch between suction units can be performed and switching thereof can be performed as needed. Moreover, data collection can be performed for each type of suction unit and, if data collection for the suction unit currently attached is completed, switching of suction units can be performed.

While, in steps S6091 and S6102, a comparison between the vacuum pressure and the threshold values T1 and T2 is performed, these threshold values can be changed according to suction unit information. This allows performing a more accurate suction determination according to the type of a suction unit.

While, in step S10040 illustrated in FIG. 10, an example in which suction parameters are obtained based on patches of the color image and the distance image and information about a suction unit has been described, usable inputs are not limited to such information. For example, a target information acquisition unit (not illustrated) can acquire the weight of a packaged object, so that suction parameters can be acquired based on patches of the color image and the distance image, information about a suction unit, and the weight of a packaged object, which is target information. In this case, in the packing material suction feature database, an axis concerning the weight of a packaged object is further added, so that suction parameters S1 which are likely to cause success can be obtained based on image patches and the weight of a packaged object.

In the first exemplary embodiment and the second exemplary embodiment, an example in which the information processing system performs a task or performs learning in such a manner that the success rates of suction and conveyance become high has been described. On the other hand, in a third exemplary embodiment, with regard to a case where an information processing system changes suction parameters according to a priority item, such as speed priority, quality priority, cost priority, and surrounding environment priority, respective examples of the learning mode and the execution mode are described. In the third exemplary embodiment, the information processing system further includes a selection unit which selects parameters for a totally optimum learning model in such a way as to be able to perform an optimum suction plan according to a priority item.

Each timing concerning suction has an advantage and a disadvantage, and differs in optimum suction control for every purpose. With regard to the timing for starting suction, if suction is started before the suction unit and the packaged object come into contact with each other, it is possible to more stably make suction successful, but there is a disadvantage such as cost increase or sound noise. With regard to the first rest time, for example, if the suction unit is kept at rest for a sufficient time at the time of suction, it is easy to make suction successful, but, in the case of an operation for repeatedly performing suction, a cycle time may become disadvantageously long. With regard to the second rest time, if the suction unit is kept at rest for a sufficient time after suction is stopped, it is easy to make release successful, but, in the case of an operation for repeatedly performing suction and conveyance, a cycle time may become disadvantageously long. In such a case, learning of timing concerning suction is performed for every purpose to be prioritized (priority item).

The priority item is described. The priority item refers to a numerical value which is intended to be preferentially improved (for example, a cycle time, a failure rate, or a stockout rate) when the information processing system 10000 performs a task of conveying a packaged object. Speed priority is a situation in which it is desired or predetermined to complete a task in a shorter time. In this case, such timing concerning suction as to make the rest time as shorter as possible is desired or predetermined. Quality priority is a situation in which it is desired or predetermined not to impair the state of an object to be conveyed. For example, to care ally place the object to be conveyed after the suction unit is stopped, such timing concerning suction as to secure a certain amount of rest time is desired, or predetermined. Cost priority is a situation in which it is desired or predetermined to reduce running cost. The running cost includes, for example, power consumption of a robot arm. In a case where speed or quality is prioritized and timing for starting suction is set earlier (before contact), the cost of, for example, air or electricity for performing suction may increase. Since electrical power is required for suction, reducing a suction time to a minimum allows reducing running cost. Surrounding environment priority is a situation in which it is desired or predetermined to mainly reduce sound noise. Since a suction operation involves sound noise, sound noise can be reduced by making a suction time as shorter as possible. For example, in a case where, for example, an operator is present near the apparatus, the sound generated at the time of suction may be felt noisy.

The packing material suction feature database in the third exemplary embodiment has two differences from the packing material suction feature database mentioned in the first and second exemplary embodiments. The first difference is that, as information about results of suction and conveyance, not only results of determination of success or failure but also data representing a time required for execution of a task, the amount of damage to the surface of a packing material, the used amount of air for use in suction, and the amount of sound caused by suction is retained together. Furthermore, the extraction unit is able to acquire these pieces of data from, for example, other sensors. The time required for execution of a task is acquired from a program with use of a timer. The amount of damage is statistically obtained by visually checking the state of the surface of a packing material during the quality inspection in a post-process and determining at what percent defective products are mixed in. Alternatively, the amount of damage is obtained by acquiring respective images captured before suction and after conveyance (which can be a plurality of images captured with varied illumination conditions or varied angles for observation), extracting any flaws of the surface of a packing material by, for example, edge detection processing, and calculating a difference between the image captured before suction and the image captured after conveyance. The used amount of air is obtained by reading a memory included in an apparatus for use in suction (air compressor). The second difference is that, instead of feature filters for extracting characteristics of a packing material, which are retained, an estimator (learning model) for obtaining suction parameters from image patches is retained. Such an estimator is obtained by configuring a relationship between a plurality of parameters as a network having a graph structure, and is thus hereinafter referred to as a "network". This network has a structure which treats image patches as inputs and treats suction parameters as outputs, and a weighting set of the network is changed according to a priority item. The weighting set of the network (learning model) is a set of weighting coefficients which connect elements of the respective layers in a neural network. There exist weighting sets of the network the number of which corresponds to the number of priority items, and, when priority items are switched, weighting sets of the network are switched, so that suction parameters to be obtained are changed. Moreover, with respect to each weighting set of the network, learning is performed for every priority item, and a result of such learning is reflected in the weighting set of the network. However, data for use in learning can be shared irrespective of priority items. In the third exemplary embodiment, with respect to these weighting sets of the network, learning is performed for every priority item within the frame of reinforcement learning, and, in the execution mode, extraction of suction parameters is performed with use of these weighting sets of the network (learning model). In other words, in reinforcement learning. "state" corresponds to image patches, "action" corresponds to values of suction parameters, "policy" corresponds to setting of suction parameters, and "reward" corresponds to a score determined for each priority item. Then, operations to be performed in the learning mode include, in order to find out such a policy as to maximize a reward for every priority item, acquiring data by various actions (suction parameters) and obtaining a reward at that time. Moreover, operations to be performed in the execution mode include, with respect to the obtained image patches, setting suction parameters by such a policy as to maximize a reward for every priority item and then performing suction and conveyance. The configuration of the information processing system 10000 in the third exemplary embodiment is similar to that illustrated in FIG. 1A in the first exemplary embodiment, and is, therefore, omitted from description here.

FIG. 11 is a diagram illustrating an apparatus configuration example of the information processing apparatus 1 in a case where, from among the learning mode and the execution mode, the learning mode has been selected by a mode switching unit (not illustrated) in the third exemplary embodiment. The configuration of the information processing apparatus 1 in the learning mode in the third exemplary embodiment is approximately similar to that illustrated in FIG. 5 in the first exemplary embodiment (learning mode). The information processing apparatus 1 illustrated in FIG. 11 includes an input unit 500, an extraction unit 1101, a determining unit 1102, an actuator control unit 5031, a suction control unit 5032, a retention unit 1105, a determination unit 1106, a data acquisition unit 507, a learning unit 1108, and a selection unit 1111. Similar functions are omitted from description, and different functions, i.e., the selection unit 1111, the retention unit 1105, the extraction unit 1101, the determining unit 1102, the determination unit 1106, and the learning unit 1108 are described.

The selection unit 1111 selects which priority item to learn from among four items, i.e., speed, quality, cost, and surrounding environment, and outputs a weighting set corresponding to the selected priority item to the learning unit

1108. Whether to learn all of the four priority items or whether to learn some of the four priority items is set based on a priority item or items which the user wants to select in the execution mode described below. In the case of learning a plurality of priority items, it is necessary to determine the sequence thereof. The sequence of selecting priority items is set in the order of the number of pieces of data required for performing learning from smaller to larger. For example, learning is performed on speed, cost, surrounding environment, and quality in this order. However, the sequence is not limited to this, but, for example, the user can be allowed to set priority items to be learned and the sequence thereof, or can be select and set a priority item having a low success rate so as to be able to focus on data collection. Moreover, while data is being collected for another priority item, a priority item in which a case where, although the reward is predetermined or expected to become high, a failure occurs and the reward is caused to become low occurs frequently can be selected.

The retention unit 1105 retains networks for obtaining the packing material suction feature database and suction parameters and weights corresponding to the networks for the respective priority items. Then, the retention unit 1105 outputs such networks and weights to the determining unit 1102 and the learning unit 1108. Moreover, the retention unit 1105 updates the packing material suction feature database and the weights of the networks as a result of learning performed by the learning unit 1108. The extraction unit 1101 extracts a suction position for the suction unit 12 based on the color image or the distance image input by the input unit 500. The extraction unit 1101 outputs information about the acquired suction position to the actuator control unit 5031 and the learning unit 1108. The determining unit 1102 acquires suction parameters input by the learning unit 1108, and outputs the acquired suction parameters to the suction control unit 5032. The determination unit 1106 determines whether success has been achieved with respect to a result of suction and conveyance being performed. Additionally, the determination unit 1106 acquires a time taken to execute a task, the amount of damage on the surface of a packing material, the used amount of air for use in suction, and the amount of sound caused by suction, and outputs the acquired pieces of information together with the result of determination of success or failure and the suction parameters to the data acquisition unit 507.

The learning unit 1108 uses, based on a priority item input by the selection unit 1111, a network for obtaining suction parameters input by the retention unit 1105 and a weight of the network corresponding to the priority item. Thus, the learning unit 1108 establishes a network for obtaining suction parameters based on the packing material suction feature database and the data input by the data acquisition unit 507. Moreover, the learning unit 1108 obtains appropriate suction parameters with use of the network with respect to the suction position input by the extraction unit 1101. Alternatively, the learning unit 1108 randomly obtains suction parameters which are to be tried out with a given probability. The learning unit 1108 sets the thus-obtained suction parameters as a request, and outputs the request to the determining unit 1102. Moreover, the learning unit 1108 performs calculation of a reward concerning the priority item based on the data group input by the data acquisition unit 507, and performs updating of the weight of the network by reinforcement learning. The learning unit 1108 outputs the updated weight of the network and the database to the retention unit 1105. The detailed procedure is described below.

Figure 12B:
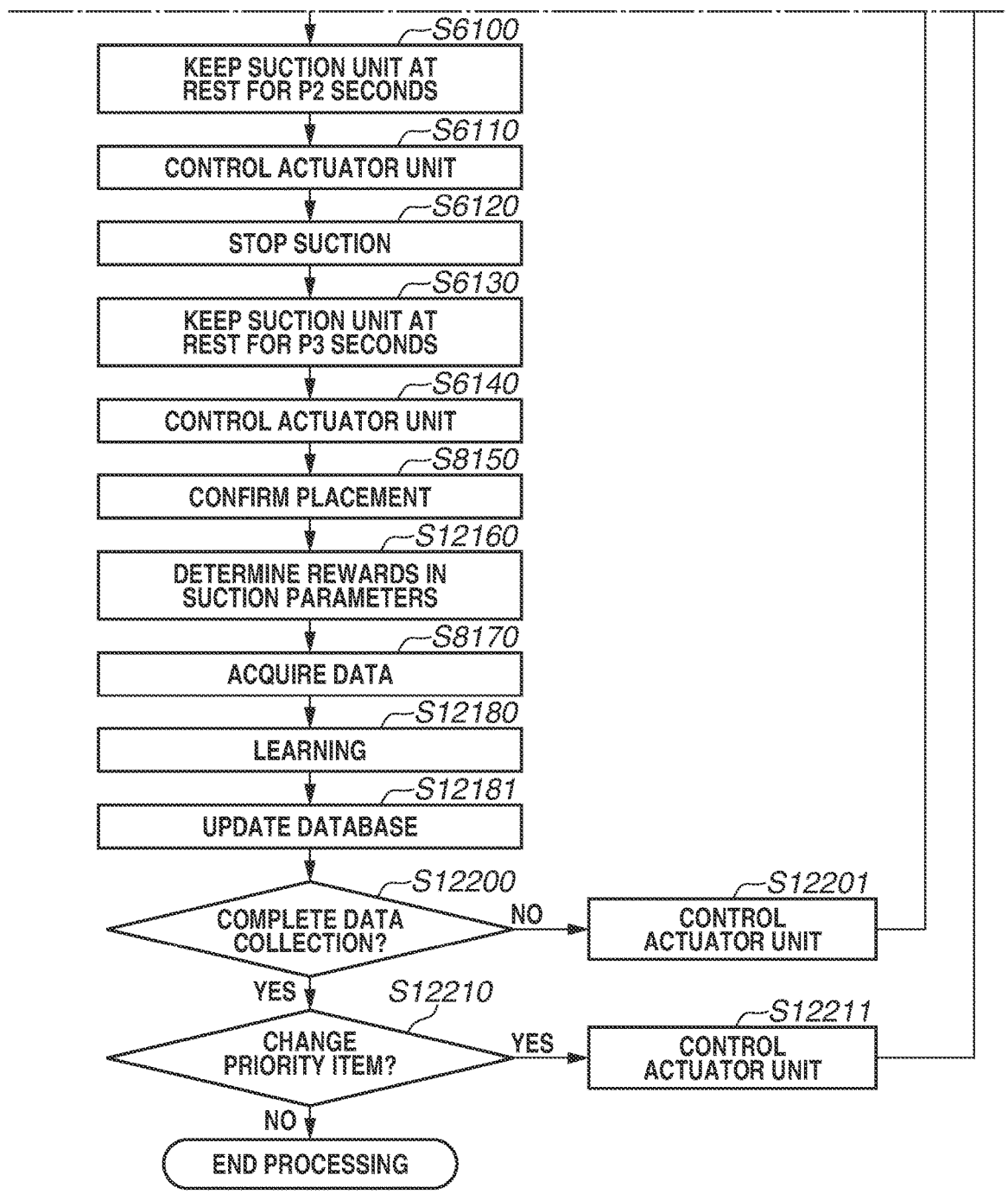
FIG. 12, which is composed of FIGS. 12A and 12B, is a flowchart illustrating a processing procedure which an information processing system performs according to the third exemplary embodiment.

Next, a processing procedure in the learning mode in the third exemplary embodiment is described. FIG. 12, which is composed of FIGS. 12A and 12B, is a flowchart illustrating a processing procedure which the information processing system 10000 including the information processing apparatus 1 in the third exemplary embodiment performs. Processing operations similar to those in the flowchart of FIG. 6 in the learning mode in the first exemplary embodiment are omitted from description here, and different processing operations are described in detail.

In step S12000, the information processing system 10000 performs initialization of the system as with step S6000. However, information to be read in from the retention unit 1105 includes the packing material suction feature database, network structures for obtaining suction parameters, and weighting sets of networks. Then, the processing proceeds to step S12001. In step S12001, the selection unit 1111 selects a priority item on which to perform learning from now from among four priority items for speed, quality, cost, and surrounding environment. Moreover, the learning unit 1108 previously loads the weight of a network corresponding to the selected priority item and establishes a network for obtaining suction parameters. Then, the processing proceeds to step S6010. In step S6010, the imaging unit 10 captures an image of the packaged object 13. In step S6020, the input unit 500 inputs the image captured by the imaging unit 10.

In step S12030, the extraction unit 1101 extracts a suction position for the packaged object 13. A specific processing operation is similar to that described in step S4030. Then, the processing proceeds to step S12031. In step S12031, the learning unit 1108 obtains, as a policy in reinforcement learning, suction parameters with use of the network and with image patches in the suction position used as inputs. The network is able to update the weight of the network in such a manner that the reward for the set priority item becomes higher by repeating learning with use of the flowchart of FIG. 12. The learning unit 1108 outputs the thus-obtained suction parameters as a request to the determining unit 1102. In the third exemplary embodiment, the request represents a set of suction parameters. Then, the processing proceeds to step S12040. In step S12040, the determining unit 1102 determines suction parameters from the request input by the learning unit 1108. Then, the processing proceeds to step S6050.

In step S6060, the actuator control unit 5031 controls the actuator unit 11 according to the control parameter determined in step S6050 in such a manner that the suction unit 12 arrives at the vicinity of the suction position input by the extraction unit 1101. In step S6070, the suction control unit 5032 performs determination by referring to the timing P1 for starting suction included in the suction parameters. If it is determined that suction is started in first (P1=0) (YES in step S6070), the processing proceeds to step S6080. On the other hand, if it is determined that suction is performed after contact with the packaged object (P1=1) (NO in step S6070), the processing proceeds to step S6071. In step S6080, the suction control unit 5032 causes the suction unit 12 to start suction. In step S6090, the actuator control unit 5031 controls the actuator unit 11 according to the control parameter determined in step S6050 in such a way as to cause the suction unit 12 to come into contact with the packaged object 13 while suctioning the packaged object 13. In step S6071, the actuator control unit 5031 controls the actuator unit 11 in such a way as to cause the suction unit 12 to come into contact with the packaged object 13. In step S6072, the suction control unit 5032 causes the suction unit 12 to start suction. In step S6100, the actuator control unit 5031 keeps the suction unit 12 at rest for the first rest time (P2 seconds) while causing the suction unit 12 to contact and suction the packaged object 13 according to the first rest time (P2) included in the suction parameters determined in step S6040. In step S6110, the actuator control unit 5031 controls the actuator unit 11 to convey the packaged object 13 to the container 15. In step S6120, the suction control unit 5032 performs control to stop suction performed by the suction unit 12. In step S6130, the actuator control unit 5031 keeps the actuator unit 11 at rest for the second rest time (P3 seconds) since suction is stopped in step S6120, according to the second rest time (P3) included in the suction parameters. In step S6140, the actuator control unit 5031 controls the actuator unit 11 to move to a position available to confirm the placement of the packaged object. In step S8150, the determination unit 1106 determines whether the packaged object has been able to be placed to the conveyance destination.

In step S12160, the determination unit 1106 gives, to the suction parameters, a plus reward if the position and orientation checked in step S8150 are within a desired or predetermined range of position and orientation and a minus reward if not so. Moreover, the determination unit 1106 calculates rewards corresponding to the respective priority items for speed, quality, cost, and surrounding environment. With regard to speed, the determination unit 1106 previously measures a time taken from the time when an image is captured in step S6010 until now, and gives a higher reward as the measured time is shorter. With regard to quality, the determination unit 1106 detects the presence or absence of flaws or deformation of the packaged object by comparing the image captured in step S6010 and the image captured for checking in step S8150 with each other. The determination unit 1106 gives a higher reward as the amount of damage on the surface of a packing material is smaller. For example, in a case where a vestige caused by suction on the surface of a packing material has been detected with use of edge detection, the reward becomes low. With regard to cost, the determination unit 1106 previously measures the used amount of air used from the time before suction is started until now, and gives a higher reward as the used amount of air is smaller. With regard to surrounding environment, the determination unit 1106 previously measures the amount of sound generated from the time before suction is started until now, and gives a higher reward as the amount of sound is smaller. The determination unit 1106 previously acquires these rewards irrespective of the selected priority item. This allows sharing learning data irrespective of priority items. The determination unit 1106 outputs image patches, suction parameters, and various rewards, which are set as a gathering, to the data acquisition unit 507. Then, the processing proceeds to step S8170.

In step S8170, the data acquisition unit 507 receives results of determination of suction parameters, suction unit information, and image patches of the color image and the distance image, thus acquiring data about packing material suction features. In step S12180, the learning unit 1108 updates the weight of a network for obtaining suction parameters within the framework of reinforcement learning of Deep Q-Network, with use of the image patches, suction parameters, and various rewards input by the data acquisition unit 507. The learning unit 1108 learns the weight of a network prepared for every priority item with respect to a reward obtained for each priority item. Thus, in reinforcement learning, for example, the learning unit 1108 calculates the state from image patches, the policy from determination of suction parameters and suction and conveyance, and the reward, which differs depending on the set priority item, from results of determination of success or failure. Then, the learning unit 1108 learns the weight of a network for obtaining optimum suction parameters within the framework of reinforcement learning. Then, the processing proceeds to step S12181.

In step S12181, the learning unit 1108 adds the data group used for the above-mentioned learning to the packing material suction feature database. Then, the learning unit 1108 updates the packing material suction feature database retained by the retention unit 1105. Then, the processing proceeds to step S12200. In step S12200, the learning unit 1108 determines whether to complete data collection with respect to the current priority item. If it is determined to complete data collection (YES in step S12200), the processing proceeds to step S12210. If it is determined not to complete data collection (NO in step S12200), the processing proceeds to step S12201. The condition for determining to complete data collection is assumed to be a case where, when suction and conveyance are performed according to the suction parameters output with use of the weight of a network corresponding to the current priority item, a situation in which the reward in the current priority item becomes greater than or equal to a threshold value successively occurs N times. If not so, it is determined not to complete data collection. In step S12201, the actuator control unit 5031 controls the actuator unit 11 in such a way as to move the imaging unit 10 to an image capturing position for performing image capturing of a next packaged object.

In step S12210, the learning unit 1108 determines whether to change the priority item. If it is determined to change the priority item (YES in step S12210), the processing proceeds to step S12211. If it is determined not to change the priority item (NO in step S12210), the processing ends. The condition for changing the priority item is a situation in which there is a priority item that has never been selected. Alternatively, such a condition is a situation in which, although all of the priority items have been selected at least once, there is a priority item in which, in data collected on behalf of another priority item, the number of contradictory instances exceeds a threshold value. The contradictory instance is, for example, an instance in which, although, normally, the reward is supposed to become high when suction and conveyance are successful, the reward has become low due to failure of suction or conveyance. For example, consider a case where data collection with the priority item set to "quality" has already been completed and, next, data collection with the priority item set to "speed" has been started. Since it is necessary to increase the "speed", for example, it is necessary to minimize the first rest time and the second rest time. At this time, to collect data which is still insufficient even in consideration of already-obtained learning data, each measurement is successively performed a plurality of times with respect to such two suction parameters. For example, measurement is performed such that (0 seconds, 0 seconds), (0.1 seconds, 0.1 seconds), (0.1 seconds, 0.2 seconds), (0.2 seconds, 0.1 seconds), (0.2 seconds, 0.2 seconds), . . . , are used in this order. Here, consider suction parameters of (0.2 seconds, 0.2 seconds) with respect to a given feature vector group. With regard to this combination, data collection is performed with the priority item set to "quality". When conveyance with (0.2 seconds, 0.2 seconds) set is performed without falling of the packaged object four times out of four times, since the surface of the packing material is never or at least not damaged, "success" occurs with respect to "quality". Nonetheless, when, at the time of data collection for "speed", falling of the packaged object occurs two times while conveyance is performed two times, data indicating "failure" with respect to "quality" is obtained. In such a case, even if, after learning is completed with respect to a series of priority items, learning of "quality" is re-performed, (0.2 seconds, 0.2 seconds) is sufficient as the success rate to be obtained when the priority item is set to "quality", and, therefore, it is necessary to search for parameters which are more likely to cause "success". In step S12211, the actuator control unit 5031 controls the actuator unit 11 in such a way as to move the imaging unit 10 to an image capturing position for performing image capturing of a next packaged object. Then, the processing returns to step S12001, in which selection of a priority item is re-performed.

With the above processing, the information processing system 10000 is able to acquire, by reinforcement learning, a network for obtaining suction parameters according to a priority item in the learning mode. This allows providing the execution mode of an information processing system which obtains optimum suction parameters for suction according to a priority item and then performs suction and conveyance.

Figure 13:
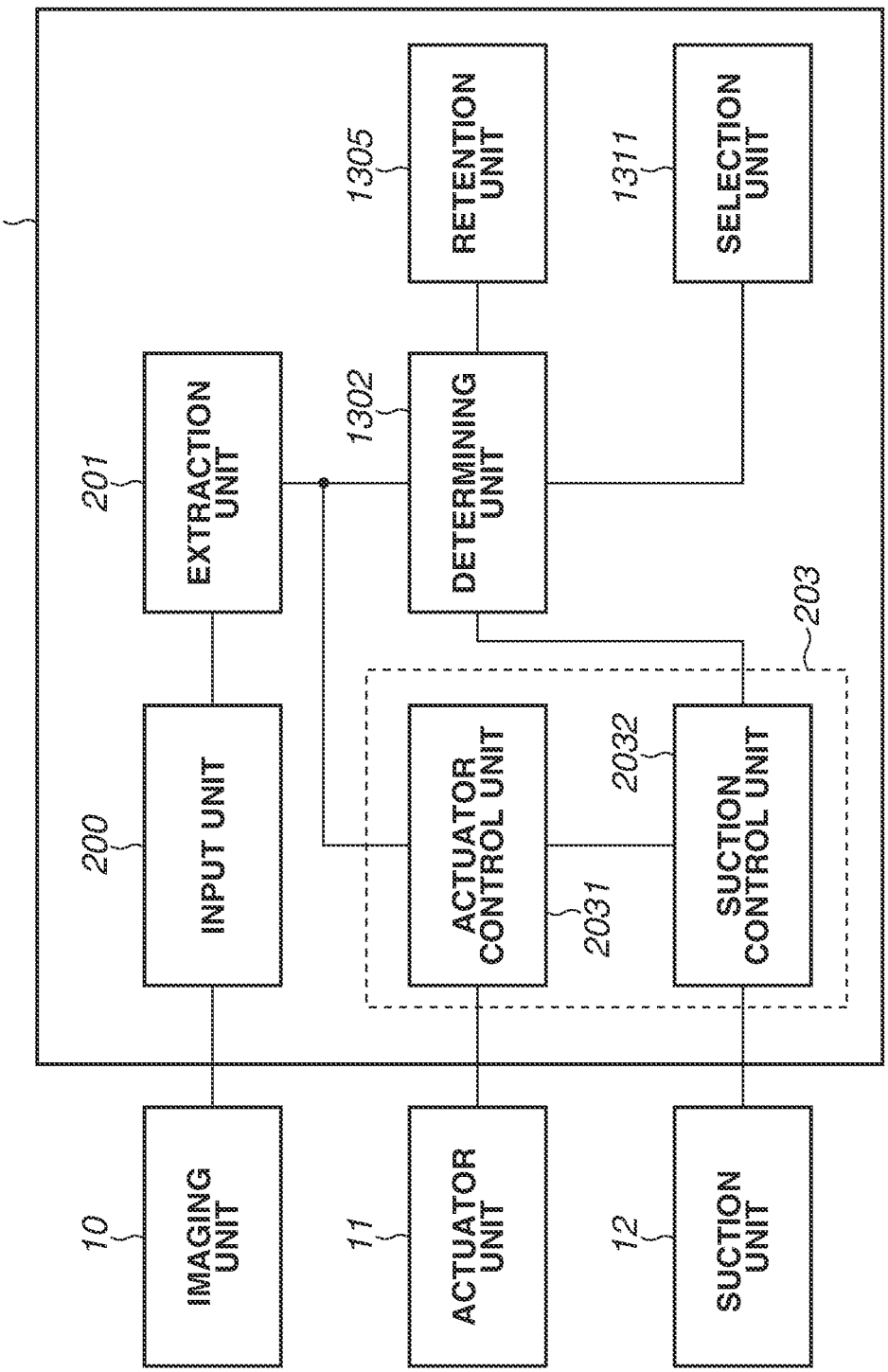
FIG. 13 is a diagram illustrating a functional configuration example of the information processing apparatus according to the third exemplary embodiment.

FIG. 13 is a diagram illustrating an apparatus configuration example of the information processing apparatus 1 in a case where, from among the learning mode and the execution mode, the execution mode has been selected by a mode switching unit (not illustrated) in the third exemplary embodiment. The configuration of the information processing apparatus 1 in the execution mode in the third exemplary embodiment is approximately similar to that illustrated in FIG. 2 in the first exemplary embodiment. The information processing apparatus 1 illustrated in FIG. 13 includes an input unit 200, an extraction unit 201, an actuator control unit 2031, a suction control unit 2032, a determining unit 1302, a retention unit 1305, and a selection unit 1311. Similar functions are omitted from description, and different functions, i.e., the determining unit 1302, the retention unit 1305, and the selection unit 1311 are described.

The determining unit 1302 determines suction parameters (timing concerning suction) based on a weighting set (parameters) selected by the selection unit 1311. The determining unit 1302 uses a network for obtaining suction parameters retained by the retention unit 1305 in an image region corresponding to the suction position input by the extraction unit 201, and a weighting set of a network corresponding to a priority item input by the selection unit 1311. The determining unit 1302 outputs the extracted suction parameters to the control unit 203. The retention unit 1305 retains networks for obtaining suction parameters and weighting sets of networks corresponding to the respective priority items, and outputs those to the determining unit 1302. The selection unit 1311 sets, as a priority item, which of four items, i.e., speed, quality, cost, and surrounding environment, is to be prioritized in performing suction and conveyance, and outputs the set priority item to the determining unit 1302.

Figure 14:
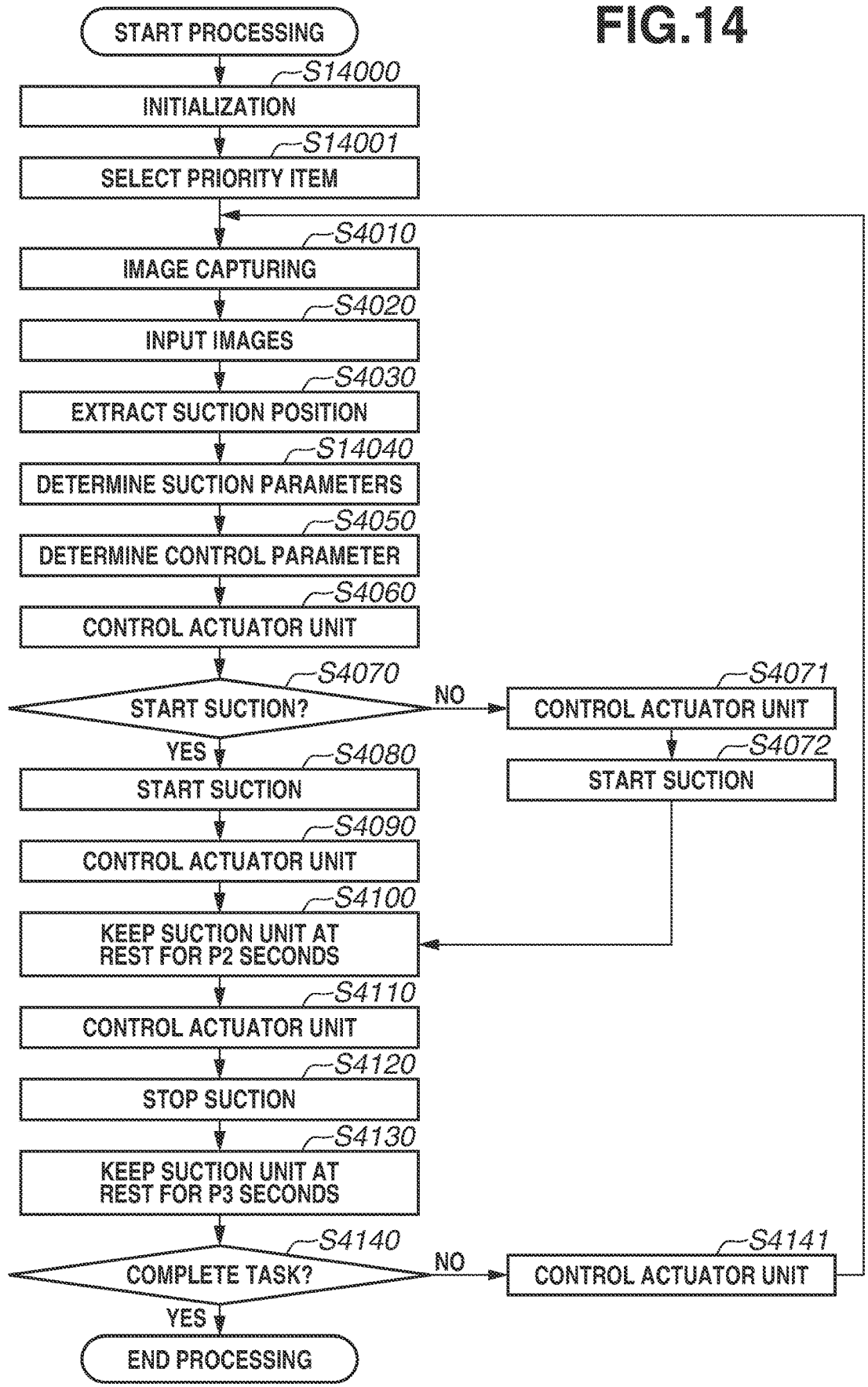
FIG. 14 is a flowchart illustrating a processing procedure which the information processing system performs according to the third exemplary embodiment.

Next, a processing procedure in the execution mode in the third exemplary embodiment is described. FIG. 14 is a flowchart illustrating a processing procedure which the information processing system 10000 including the information processing apparatus 1 in the third exemplary embodiment performs in the task execution mode. The flowchart of FIG. 14 in the third exemplary embodiment is approximately similar to the flowchart of FIG. 4 in the first exemplary embodiment. Processing illustrated in FIG. 14, which the information processing system 10000 performs, is described. In step S14000, the information processing system 10000 performs initialization of the system as with step S4000. However, information to be read in from the retention unit 1305 includes network structures for obtaining suction parameters, and weighting sets of networks. Then, the processing proceeds to step S14001. In step S14001, the selection unit 1311 selects a priority item from among four priority items for speed, quality, cost, and surrounding environment, and also selects a weighting set of a network concerning the priority item. As the method of selecting a priority item, the user can be allowed to select any one of priority items for speed, quality, cost, and surrounding environment via a user interface unit (not illustrated), and the selection unit 1311 can set the selected priority item. Then, the determining unit 1302 receives networks and a weight of a network corresponding to the selected priority item from the retention unit 1305, and configures a network for obtaining suction parameters. Then, the processing proceeds to step S4010. In step S4010, the imaging unit 10 captures an image of the packaged object 13, which is to be conveyed. In step S4020, the input unit 200 inputs the image captured by the imaging unit 10. In step S4030, the extraction unit 201 extracts a suction position for the packaged object 13. In step S14040, the determining unit 1302 determines suction parameters in the suction position acquired in step S4030 with use of the color image, the distance image, and the network. The determined suction parameters are parameters obtained with use of the weight set corresponding to the set priority item, and are suction parameters suited for a purpose which is intended to be prioritized. Then, the processing proceeds to step S4050. Processing operations in step S4050 and subsequent steps are similar to the processing operations in the flowchart of FIG. 4 in the first exemplary embodiment, and are, therefore, omitted from description here.

With the above processing, the information processing system 10000 is able to perform suction and conveyance based on a priority item in the execution mode. As mentioned above, in the third exemplary embodiment, priority items are switched in each of the learning mode and the task execution mode of the information processing system. This allows obtaining optimum suction parameters and performing suction and conveyance with respect to a purpose for improving the speed, quality, cost, and surrounding environment. Moreover, this allows learning the weighting sets of networks corresponding to the respective priority items.

In the learning mode in the third exemplary embodiment, a confirmation of operation from the time when suction is started to the time when conveyance is started as in steps S6092 and S6103 in the learning mode in the first exemplary embodiment is not performed, such a confirmation is collectively performed in step S12160. However, the third exemplary embodiment is not limited to this, but, as in steps S6092 and S6103 in the learning mode in the first exemplary embodiment, the confirmation can be performed in a step-by-step manner in performing determination of suction parameters, and, then, the processing can proceed to data collection in step S8170. In this case, although a failure occurs as a task of suction and conveyance, since steps of, for example, conveyance are omitted as a shortcut, a time required to execute a task becomes very short or does not exceed a predetermined time. Therefore, in a case where the set priority item is speed priority, it is necessary to make adjustment in such a way as to prevent a reward from becoming too large.

While, in step S12160 illustrated in FIG. 12, an example in which a reward is calculated for each result of determination of success or failure of suction and conveyance or for each priority item has been described, the timing for calculating a reward is not limited to this. For example, in step S12160, the determination unit 1106 can output measured values for each result of determination of success or failure or for each priority item to the data acquisition unit 507. Then, in step S12180, the learning unit 1108, which has received such a data group, can calculate a reward. In this way, since measured values for each result of determination of success or failure or for each priority item are stored in the packing material suction feature database, an effect which is exerted when the method for calculating a reward has been changed can be readily considered.

While, in step S12200 illustrated in FIG. 12, an example in which the learning unit 1108 completes data collection when the obtained suction parameters have repeatedly produced high rewards with respect to the currently selected priority item and then performs learning of a next priority item has been described, the third exemplary embodiment is not limited to this. For example, to learn each priority item little by little, the learning unit 1108 can complete data collection each time performing data collection a predetermined number of times, and the processing then can proceed to step S12210, so that changing of priority items can be repeated.

While it has been described that step S12210 illustrated in FIG. 12 is the last processing operation in the learning mode in the flow of processing operations, the third exemplary embodiment is not limited to this. For example, consider a case where such suction parameters as to be able to provide a sufficiently high reward are previously set with respect to image patches at a given suction position. At this time, in step S12031, the learning unit 1108 can temporarily perform switching of priority items. Then, the learning unit 1108 can also change the weight set of the network. Then, the learning unit 1108 can obtain suction parameters required for a priority item to which switching has been performed and perform learning with use of the obtained suction parameters. This allows preventing excessive learning from being performed with respect to input image patches which have already become able to be used to select appropriate suction parameters in a given priority item. As a result, this allows efficiently acquiring learning data which is insufficient in another priority item.

While, in step S14001 illustrated in FIG. 14, an example in which, when the selection unit 1311 selects a priority item, the user is allowed to perform selection has been described, the method of selecting a priority item is not limited to this. For example, consider a case where a management unit (not illustrated) manages the total amount (norm) of pick-and-place which is to be performed per day. For example, pick-and-place is performed in "speed priority". When detecting that the today's norm would be able to be sufficiently achieved, the management unit can issue an instruction to the selection unit 1311 to change the priority item to "quality priority". Then, the selection unit 1311 can change the priority item to that for quality. Moreover, in a time range in which the number of operators increases, the management unit can issue an instruction to the selection unit 1311 to change the priority item to "surrounding environment priority".

The present disclosure can be implemented by performing the following processing. Specifically, the processing includes supplying software (program) for implementing the functions of each of the above-described exemplary embodiments to a system or apparatus via a network for data communication or various types of storage media. Then, the processing includes causing a computer central processing unit (CPU) or a micro processing unit (MPU)) of the system or apparatus to read out and execute the program. Moreover, the processing can include recording the program on a computer-readable recording medium and providing such a recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-118122 filed Jun. 21, 2018, which is hereby incorporated by reference herein in its entirety.

What is claimed is:

1. An information processing apparatus to output control information for controlling a suction device configured to suction a packaged object, the information processing apparatus comprising:

a processor and a memory coupled to each other and to perform operations including:

inputting an image, wherein the image is an image of a surface of the packaged object captured by an image capturing unit, determining whether a suction start timing is before when the suction device comes into contact with the packaged object depending on a state of the surface of the packaged object specified from the image, and outputting the control information to a control unit configured to control the suction device, wherein the control information is to control the suction start timing based on the determining regarding the suction start timing.

2. The information processing apparatus according to claim 1, wherein inputting includes inputting at least one image obtained by performing image capturing of the surface of the packaged object, and wherein, in a case where a quantity of wrinkles on the surface of the packaged object specified from each image varies, outputting includes outputting the control information to change the suction start timing, according to the quantity of wrinkles on the surface of the packaged object.

3. The information processing apparatus according to claim 2, wherein, in a case where there are wrinkles on the surface of the packaged object specified based on the image, outputting includes outputting the control information to change the suction start timing, depending on a quantity of wrinkles on the surface of the packaged object.

4. The information processing apparatus according to claim 1, wherein outputting includes outputting the control information indicating whether the suction start timing is before or after the suction device and the surface of the packaged object come into contact with each other.

5. The information processing apparatus according to claim 1, wherein determining further includes determining the control information to control the suction start timing depending on the state of the surface of the packaged object, based on data indicating a result representing whether suction is successful with respect to a combination of the state of the surface of the packaged object and the control information, and wherein outputting includes outputting the control information regarding the determination made by the determining.

6. The information processing apparatus according to claim 5, wherein determining further includes determining the control information to control the suction start timing, with the image input used as an input, based on a trained model obtained by learning the control information with respect to the state of the surface of the packaged object.

7. The information processing apparatus according to claim 5, wherein determining further includes determining a first rest time indicating a time from when the suction device and the surface of the packaged object come into contact with each other to when conveyance performed by the suction device is started, from the state of the surface of the packaged object, and wherein outputting includes outputting the control information indicating timing at which the suction device starts conveyance, after the determined first rest time elapses.

8. The information processing apparatus according to claim 5, wherein determining further includes determining a second rest time indicating a time from when the suction device stops suction after conveying the packaged object to a conveyance destination to when movement of the suction device is started, from the state of the surface of the packaged object, and wherein outputting includes outputting the control information to control movement of the suction device, after the determined second rest time determined elapses.

9. The information processing apparatus according to claim 1, wherein the operations further include extracting a suction position at which the packaged object is suctioned by the suction device, by comparing a template which is an image feature indicating a state of the surface of the packaged object suited for suction with the input image, and wherein outputting includes outputting the control information based on a state of the surface of the packaged object specified from an image region corresponding to the suction position.

10. The information processing apparatus according to claim 1, wherein determining further includes determining a result representing whether control by the control information is successful or failed, by observing a vacuum pressure of the suction device, wherein the operations further include learning a data set indicating the control information which is likely to cause success in the state of the surface of the packaged object, based on the determined successful or failed result, and wherein outputting includes outputting the control information based on the state of the surface of the packaged object specified from the image and the data set.

11. The information processing apparatus according to claim 10, wherein determining includes determining that control by the control information is successful if the vacuum pressure is smaller than a predetermined threshold value and determines that control by the control information is failed if the vacuum pressure is larger than or equal to the predetermined threshold value.

12. The information processing apparatus according to claim 11, wherein learning includes updating connection weights of a first trained model for outputting the control information based on an input image, by reinforcement learning which (i) gives a positive reward if suction for the packaged object is successful and (ii) gives a negative reward if suction for the packaged object is failed, and wherein outputting includes outputting the control information based on the updated connection weights of the first trained model.

13. The information processing apparatus according to claim 1, wherein the suction device is a plurality of suction devices different in size, and wherein outputting includes outputting the control information to control timing at which suction is started, based on the state of the surface of the packaged object specified from the image and the size of a suction device of the plurality of suction devices.

14. The information processing apparatus according to claim 1, wherein the operations further include receiving, from a user, a request with any one of speed, quality, cost, and environmental sound set as a priority item in a task of conveying the packaged object, and wherein outputting includes outputting the control information satisfying a predetermined condition about the priority item, according to the received request.

15. The information processing apparatus according to claim 14, wherein the operations further include selecting a second trained model obtained by learning the control information satisfying the predetermined condition about the priority item, according to the received request, and wherein outputting includes outputting the control information based on the state of the surface of the packaged object specified from the image and the second trained model.

16. The information processing apparatus according to claim 15, wherein the operations further include learning which includes updating connection weights of the second trained model for outputting the control information, with use of reinforcement learning which (i) gives a positive reward if suction for the packaged object is successful and the predetermined condition about the priority item is satisfied and (ii) gives a negative reward if suction for the packaged object is failed or the predetermined condition about the priority item is not satisfied, in association with the priority item in the task of conveying the packaged object.

17. An information processing apparatus to output control information for controlling a suction device configured to suction a packaged object, the information processing apparatus comprising:
 a processor and a memory coupled to each other and to perform operations including:
 inputting an image, wherein the image is an image of a surface of the packaged object captured by an image capturing unit,
 determining whether a suction start timing is before when the suction device comes into contact with the packaged object depending on a quantity of wrinkles on the surface of the packaged object specified from the image, and
 outputting the control information to a control unit configured to control the suction device,
 wherein the control information is to control the suction start timing based on the determining regarding the suction start timing.

18. The information processing apparatus according to claim 17, wherein, in a case where the quantity of wrinkles on the surface of the packaged object specified from the image becomes larger than a predetermined threshold value, outputting includes outputting the control information to change the suction start timing such that suction by the suction device is started before the suction device comes into contact with the packaged object.

19. A method for an information processing apparatus to output control information for controlling a suction device configured to suction a packaged object, the method comprising:
 inputting an image, wherein the image is an image of a surface of the packaged object captured by an image capturing unit;
 determining whether a suction start timing is before when the suction device comes into contact with the packaged object depending on a state of the surface of the packaged object specified from the image; and
 outputting the control information to a control unit configured to control the suction device,
 wherein the control information is to control the suction start timing based on the determining regarding the suction start timing.

20. A non-transitory computer-readable storage medium storing a program to cause a computer to perform a method for an information processing apparatus to output control information for controlling a suction device configured to suction a packaged object, the method comprising:
 inputting an image, wherein the image is an image of a surface of the packaged object captured by an image capturing unit;
 determining whether a suction start timing is before when the suction device comes into contact with the packaged object depending on a state of the surface of the packaged object specified from the image; and
 outputting the control information to a control unit configured to control the suction device,
 wherein the control information is to control the suction start timing based on the determining regarding the suction start timing.

* * * * *